(12) United States Patent
Tazume et al.

(10) Patent No.: US 11,816,999 B2
(45) Date of Patent: Nov. 14, 2023

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventors: Toshiaki Tazume, Tokyo (JP); Hayato Mizukami, Tokyo (JP); Qingnan Zhou, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 315 days.

(21) Appl. No.: 15/734,227

(22) PCT Filed: Dec. 25, 2018

(86) PCT No.: PCT/JP2018/047480
§ 371 (c)(1),
(2) Date: Dec. 2, 2020

(87) PCT Pub. No.: WO2020/136703
PCT Pub. Date: Jul. 2, 2020

(65) Prior Publication Data
US 2021/0209954 A1    Jul. 8, 2021

(51) Int. Cl.
*G08G 5/00* (2006.01)
*B64C 39/02* (2023.01)
*G05D 1/06* (2006.01)
*G05D 1/10* (2006.01)

(52) U.S. Cl.
CPC ......... *G08G 5/0073* (2013.01); *B64C 39/024* (2013.01); *G05D 1/0653* (2013.01); *G05D 1/101* (2013.01); *G08G 5/0069* (2013.01); *B64U 2201/10* (2023.01); *B64U 2201/20* (2023.01)

(58) Field of Classification Search
CPC .. G08G 5/0073; G08G 5/0069; B64C 39/024; G05D 1/0653; G05D 1/101; B64U 2201/10; B64U 2201/20
See application file for complete search history.

(56) References Cited

U.S. PATENT DOCUMENTS 6,974,077 B1 * 12/2005 Beyder ................. G06Q 10/08
235/383
9,984,579 B1 * 5/2018 Harris ..................... B64D 47/06
10,029,787 B1 * 7/2018 Lesser ................... B64C 39/024
(Continued)

FOREIGN PATENT DOCUMENTS

JP    2017523087 A    8/2017
WO    2018155700 A1   8/2018

OTHER PUBLICATIONS

English translation of the International Search Report for PCT/JP2018/047480.

*Primary Examiner* — Hussein Elchanti
(74) *Attorney, Agent, or Firm* — HEA LAW PLLC

(57) ABSTRACT

Detection means of an unmanned aerial vehicle control system is configured to detect an object existing at a location at which at least one of landing or takeoff of an unmanned aerial vehicle is to be performed. Type identification means is configured to identify a type of the object based on a result of detection by the detection means. Restriction means is configured to restrict at least one of landing or takeoff of the unmanned aerial vehicle based on the type identified by the type identification means.

13 Claims, 16 Drawing Sheets

(56) References Cited

U.S. PATENT DOCUMENTS

| | | | |
|---|---|---|---|
| 10,198,955 B1 * | 2/2019 | Boyd | G08G 5/0086 |
| 10,248,120 B1 * | 4/2019 | Siegel | G05D 1/0088 |
| 10,370,093 B1 * | 8/2019 | Beckman | B64C 27/001 |
| 10,395,544 B1 * | 8/2019 | Harris | G08G 5/0069 |
| 10,466,700 B1 * | 11/2019 | Carmack | G08G 5/0069 |
| 10,497,129 B1 * | 12/2019 | Cui | H04N 5/2625 |
| 2017/0320572 A1 * | 11/2017 | High | G06Q 10/0832 |
| 2019/0235494 A1 * | 8/2019 | Cantrell | G05D 1/106 |
| 2019/0347916 A1 * | 11/2019 | Wild | H04L 67/1095 |
| 2020/0090255 A1 * | 3/2020 | Rodriguez Bravo | G01W 1/10 |

* cited by examiner

FIG.2
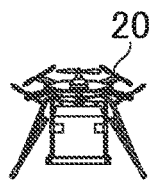
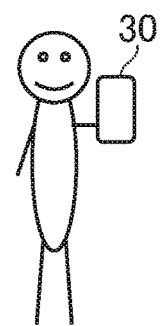
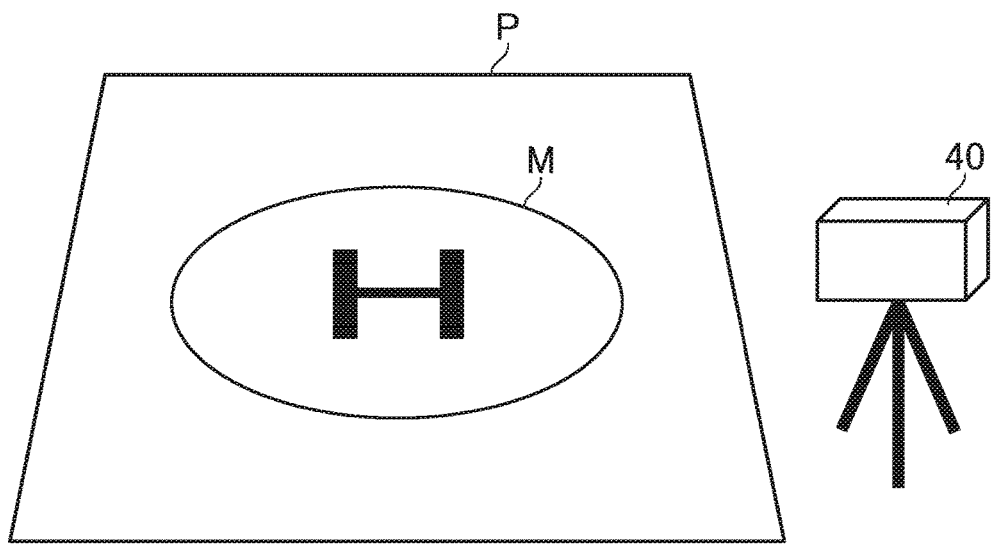

FIG.3
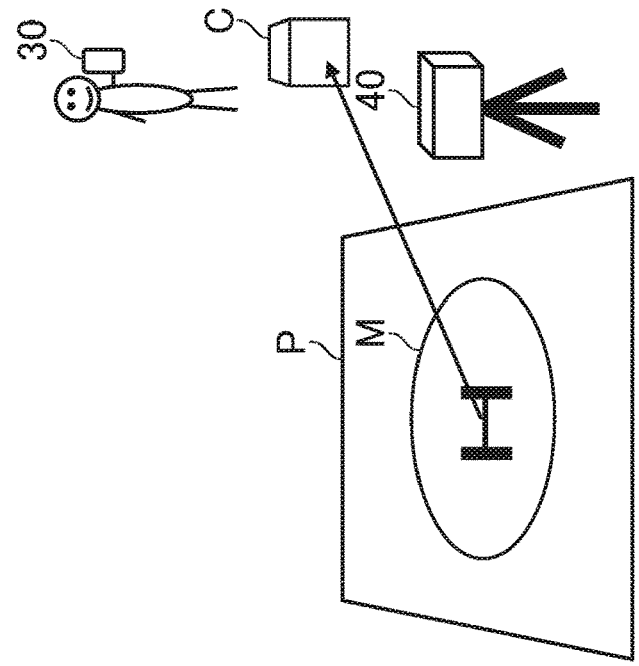
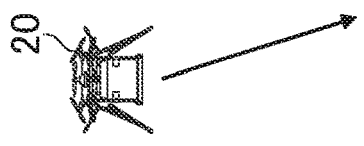
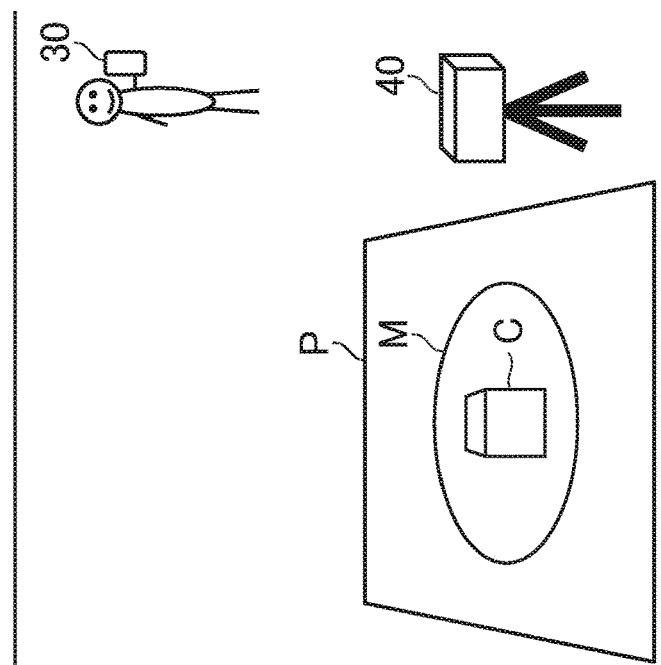
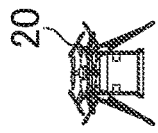

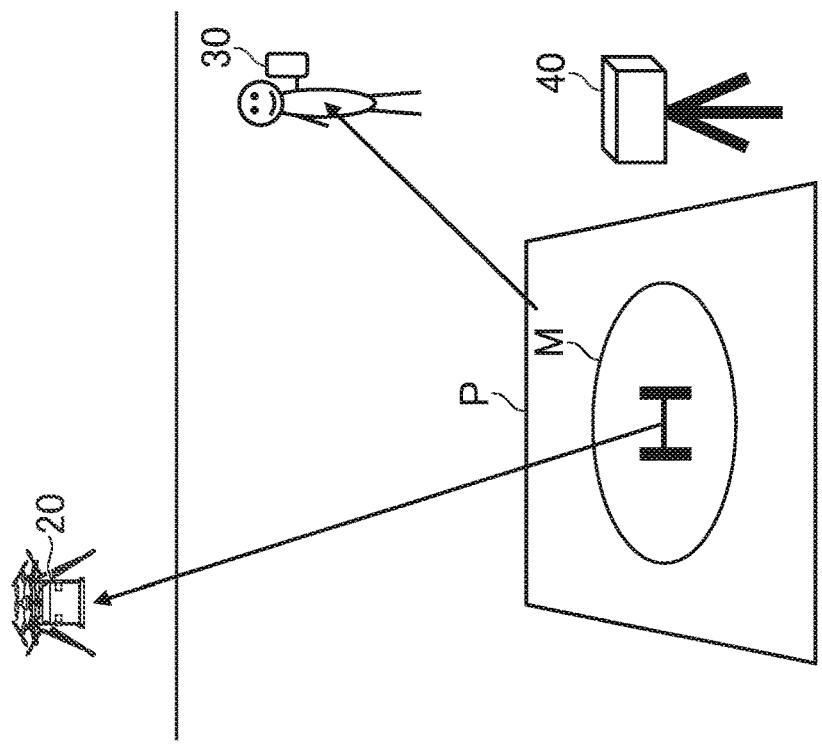
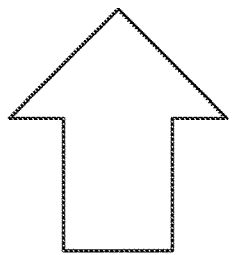
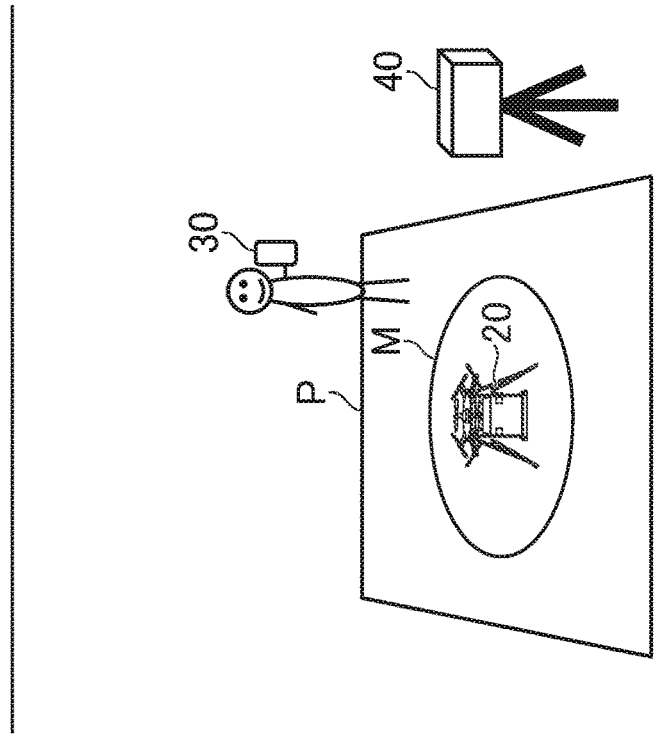
FIG.6

FIG.9

| MODE | POSITION | RESTRICTION TARGET TYPE ||
| --- | --- | --- | --- |
| | | STILL OBJECT | MOVING OBJECT |
| LANDING MODE | INSIDE PORT | × | × |
| | NEAR PORT | ○ | × |
| TAKEOFF MODE | INSIDE PORT | ○ | × |
| | NEAR PORT | ○ | × |

| UNMANNED AERIAL VEHICLE ID | DESTINATION LOCATION | FLIGHT ROUTE | FLIGHT MODE | POSITIONAL INFORMATION |
|---|---|---|---|---|
| u00001 | X01,Y01 | ROUTE INFORMATION1 | LANDING MODE | X11,Y11 |
| u00002 | X02,Y02 | ROUTE INFORMATION2 | AUTONOMOUS FLIGHT MODE | X12,Y12 |
| u00003 | X03,Y03 | ROUTE INFORMATION3 | TAKEOFF MODE | X13,Y13 |
| ... | ... | ... | ... | ... |

DT2

UNMANNED AERIAL VEHICLE CONTROL SYSTEM, UNMANNED AERIAL VEHICLE CONTROL METHOD, AND PROGRAM

CROSS REFERENCE TO RELATED APPLICATIONS

This application is a National Stage of International Application No. PCT/JP2018/047480 filed Dec. 25, 2018. The contents of the above document is incorporated herein by reference in its entirety.

TECHNICAL FIELD

The present invention relates to an unmanned aerial vehicle control system, an unmanned aerial vehicle control method, and a program.

BACKGROUND ART

Hitherto, there has been known a technology of controlling flight of an unmanned aerial vehicle by detecting an object through use of a camera or an infrared sensor, for example. For example, in Patent Literature 1, there is described a technology involving using a laser sensor to detect whether there is an object, for example, a person, inside a port for landing and takeoff of an unmanned aerial vehicle, and restricting landing and takeoff of the unmanned aerial vehicle when there is an object inside the port, to thereby improve safety at the time of landing and takeoff.

CITATION LIST

Patent Literature

[PTL 1] WO 2018/155700 A1

SUMMARY OF INVENTION

Technical Problem

However, in the technology of Patent Literature 1, landing and takeoff are forcibly restricted when an object is detected by the laser sensor, and thus even an object such as fallen leaves or a plastic bag, which does not substantially influence safety at the time of landing and takeoff, inhibits the unmanned aerial vehicle from landing and taking off. Therefore, in the technology of Patent Literature 1, landing and takeoff are restricted more strictly than required, which means there is little flexibility.

One embodiment of the present invention has been made in view of the above-mentioned issue, and has an object to provide an unmanned aerial vehicle control system, an unmanned aerial vehicle control method, and a program, which achieve both of improvement in safety and improvement in flexibility.

Solution to Problem

In order to solve the issue described above, according to one embodiment of the present invention, there is provided an unmanned aerial vehicle control system including: detection means for detecting an object existing at a location at which at least one of landing or takeoff of an unmanned aerial vehicle is to be performed; type identification means for identifying a type of the object based on a result of detection by the detection means; and restriction means for restricting at least one of landing or takeoff of the unmanned aerial vehicle based on the type identified by the type identification means.

According to one embodiment of the present invention, there is provided an unmanned aerial vehicle control method including: a detection step of detecting an object existing at a location at which at least one of landing or takeoff of an unmanned aerial vehicle is to be performed; a type identification step of identifying a type of the object based on a result of detection performed in the detection step; and a restriction step of restricting at least one of landing or takeoff of the unmanned aerial vehicle based on the type identified in the type identification step.

According to one embodiment of the present invention, there is provided a program for causing a computer to function as: type identification means for identifying, based on a result of detection by detection means for detecting an object existing at a location at which at least one of landing or takeoff of an unmanned aerial vehicle is to be performed, a type of the object; and restriction means for restricting at least one of landing or takeoff of the unmanned aerial vehicle based on the type identified by the type identification means.

Further, in one embodiment of the present invention, the type identification means is configured to identify, as the type, whether the object is a still object that is still or whether the object is a moving object that is moving or is movable, and the restriction means is configured to restrict at least one of landing or takeoff of the unmanned aerial vehicle based on whether the object is the still object or whether the object is the moving object.

Further, in one embodiment of the present invention, the unmanned aerial vehicle is capable of carrying a package, the type identification means is configured to identify, as the type, whether the object is a package or whether the object is something other than a package, and the restriction means is configured to restrict at least one of landing or takeoff of the unmanned aerial vehicle based on whether the object is a package or whether the object is something other than a package.

Further, in one embodiment of the present invention, an area for enabling the unmanned aerial vehicle to perform at least one of landing or takeoff is determined in advance as the location, and the detection means is configured to detect at least one of an object existing in the area or an object existing near the area.

Further, in one embodiment of the present invention, the unmanned aerial vehicle control system further includes position identification means for identifying a position of the object, and the restriction means is configured to restrict at least one of landing or takeoff of the unmanned aerial vehicle based further on the position identified by the position identification means.

Further, in one embodiment of the present invention, the restriction means is configured to restrict at least one of landing or takeoff of the unmanned aerial vehicle when the type identified by the type identification means is a predetermined restriction target type, and the predetermined restriction target type is set in accordance with the position identified by the position identification means.

Further, in one embodiment of the present invention, an area for enabling the unmanned aerial vehicle to perform at least one of landing or takeoff is determined in advance as the location, the position identification means is configured to identify whether the position is in the area or near the area, and the restriction means is configured to restrict at least one of landing or takeoff of the unmanned aerial vehicle based on whether the object is in the area or near the area.

Further, in one embodiment of the present invention, the restriction means is configured to restrict at least one of landing or takeoff of the unmanned aerial vehicle when the type identified by the type identification means is a predetermined restriction target type, the unmanned aerial vehicle is configured to fly based on any one of a plurality of flight modes, the unmanned aerial vehicle control system further includes flight mode identification means for identifying a flight mode of the unmanned aerial vehicle, and the predetermined restriction target type is set in accordance with the flight mode.

Further, in one embodiment of the present invention, the restriction means is configured to restrict at least one of landing or takeoff of the unmanned aerial vehicle when the type identified by the type identification means is a predetermined restriction target type, and the predetermined restriction target type is set depending on whether the unmanned aerial vehicle is to perform landing or takeoff.

Further, in one embodiment of the present invention, the unmanned aerial vehicle is capable of carrying a package, the predetermined restriction target type is a package, the restriction means is configured to avoid restricting takeoff of the unmanned aerial vehicle when the unmanned aerial vehicle is to take off and the type identification means has identified a package, and the restriction means is configured to restrict landing of the unmanned aerial vehicle when the unmanned aerial vehicle is to land and the type identification means has identified a package.

Further, in one embodiment of the present invention, the unmanned aerial vehicle control system further includes: positional relationship identification means for identifying a positional relationship between the unmanned aerial vehicle during flight and the location; and transmission means for transmitting information that depends on the positional relationship identified by the positional relationship identification means to a transmission destination that depends on the positional relationship.

Further, in one embodiment of the present invention, the positional relationship identification means is configured to identify, as the positional relationship, a distance between the unmanned aerial vehicle during flight and the location, and the transmission means is configured to transmit information that depends on the distance identified by the positional relationship identification means to a transmission destination that depends on the distance.

Further, in one embodiment of the present invention, the transmission means is configured to: transmit first information to a first transmission destination when the distance has become smaller than a first threshold value; and transmit second information to a second transmission destination when the distance has become smaller than a second threshold value, which is smaller than the first threshold value.

Further, in one embodiment of the present invention, the transmission means is configured to: transmit a predetermined message to a user terminal when the distance has become smaller than the first threshold value; and transmit a control signal that is based on the restriction means to the unmanned aerial vehicle when the distance has become smaller than the second threshold value.

Further, in one embodiment of the present invention, there is provided an unmanned aerial vehicle control system including: positional relationship identification means for identifying a positional relationship between an unmanned aerial vehicle during flight and a location at which at least one of landing or takeoff of the unmanned aerial vehicle is to be performed; and transmission means for transmitting information that depends on the positional relationship identified by the positional relationship identification means to a transmission destination that depends on the positional relationship.

Advantageous Effects of Invention

According to one embodiment of the present invention, both of the improvement in safety and the improvement in flexibility can be achieved.

BRIEF DESCRIPTION OF DRAWINGS

FIG. 2 is a diagram for illustrating a situation in which the unmanned aerial vehicle lands.

FIG. 3 is a diagram for illustrating a situation in which landing of the unmanned aerial vehicle is restricted.

FIG. 6 is a diagram for illustrating a situation in which takeoff of the unmanned aerial vehicle is restricted.

FIG. 9 is a table for showing an example of data storage of restriction target type data.

FIG. 10 is a table for showing an example of data storage of flight management data.

DESCRIPTION OF EMBODIMENTS

1. First Embodiment

A description is now given of an unmanned aerial vehicle control system according to an exemplary embodiment of the present invention (hereinafter referred to as "first embodiment").

[1-1. Entire Configuration of Unmanned Aerial Vehicle Control System]

Figure 1:
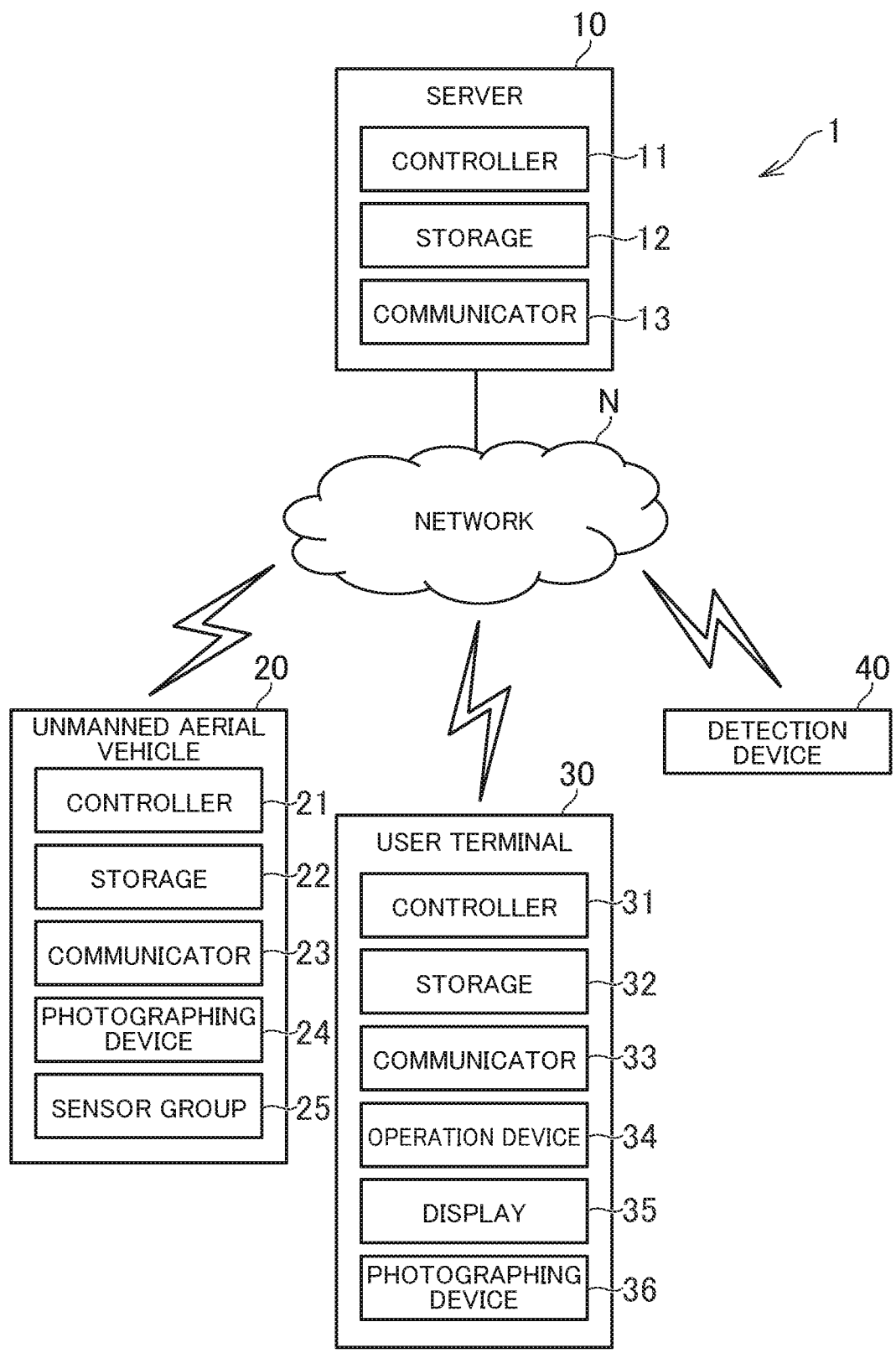
FIG. 1 is a diagram for illustrating an entire configuration of an unmanned aerial vehicle control system.

FIG. 1 is a diagram for illustrating an entire configuration of the unmanned aerial vehicle control system. As illustrated in FIG. 1, an unmanned aerial vehicle control system 1 includes a server 10, an unmanned aerial vehicle 20, a user terminal 30, and a detection device 40, and those components are connected to a network N. In FIG. 1, one server 10, one unmanned aerial vehicle 20, one user terminal 30, and one detection device 40 are illustrated. However, there may be a plurality of servers 10, a plurality of unmanned aerial vehicles 20, a plurality of user terminals 30, and a plurality of detection devices 40.

The server 10 is a server computer. The server 10 includes a controller 11, a storage 12, and a communicator 13. The controller 11 includes, for example, at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and is configured to perform data communication via the network N.

The unmanned aerial vehicle 20 is an aerial vehicle without a person, and is, for example, an unmanned aerial vehicle (so-called "drone") configured to be driven by a battery, or an unmanned aerial vehicle configured to be driven by an engine. The unmanned aerial vehicle 20 includes a controller 21, a storage 22, a communicator 23, a photographing device 24, and a sensor group 25. Although the unmanned aerial vehicle 20 includes a propeller, a motor, a battery, and an antenna, for example, a description thereof is omitted here.

The hardware configurations of the controller 21, the storage 22, and the communicator 23 may be similar to those of the controller 11, the storage 12, and the communicator 13. The communicator 23 may include a wireless communication interface for a specific device (e.g., so-called "radio controller"), such as FASST, FHSS, DMSS, or AFHSS. The unmanned aerial vehicle 20 may be operated by wirelessly communicating to/from a controller (so-called "proportional controller") via the communicator 13.

The photographing device 24 includes at least one camera. For example, the photographing device 24 includes an image pickup element such as a CCD image sensor or a CMOS image sensor, and records an image picked up by the image pickup element as digital data. The image may be a still image or a moving image picked up continuously at a predetermined frame rate.

The sensor group 25 includes at least one sensor, and includes a GPS sensor, for example. The GPS sensor includes a receiver configured to receive signals from satellites, and for example, detects positional information based on the signals received by the receiver. The positional information is, for example, latitude/longitude information or coordinate information, and may indicate, for example, a two-dimensional position on the ground or a three-dimensional position including an altitude as well. The unmanned aerial vehicle 20 may mount any sensor, and the sensor group 25 may include any sensor such as an acceleration sensor, a gyro sensor, a wind sensor, a geomagnetic sensor, an altitude sensor, a displacement sensor, a pressure-sensitive sensor, an infrared sensor, a laser sensor, an ultrasonic sensor, or a temperature sensor.

The user terminal 30 is a computer to be operated by the user. For example, the user terminal 30 is, for example, a cell phone (including smartphone), a mobile information terminal (including tablet computer), or a personal computer. In this embodiment, the user terminal 30 includes a controller 31, a storage 32, a communicator 33, an operation device 34, a display 35, and a photographing device 36. The hardware configurations of the controller 31, the storage 32, the communicator 33, and the photographing device 36 may be similar to those of the controller 11, the storage 12, the communicator 13, and the photographing device 24.

The operation device 34 is an input device, and is, for example, a pointing device such as a touch panel or a mouse, a keyboard, or a button. The operation device 34 transfers details of operation by the user to the controller 31. The display 35 is a liquid crystal display or an organic EL display, for example. The display 35 displays a screen in accordance with an instruction from the controller 31.

The detection device 40 is a device for detecting an object. For example, the detection device 40 is a camera, an infrared sensor, a depth sensor, a laser sensor, a heat sensor, an ultrasonic sensor, a light detection and ranging or laser imaging detection and ranging (LIDAR) sensor, a human sensor, or a pressure sensor. The detection device 40 may use this plurality of sensors in combination.

Various known methods can be applied as the object detection method itself. In this embodiment, a description is given of an exemplary case in which the detection device 40 is a camera, and an image picked up by the detection device 40 is analyzed to detect an object. For example, the detection device 40 includes a communication interface for wired communication or wireless communication, and can transmit a result of detection by itself (photographed image picked up by camera in this embodiment) to, for example, the server 10. However, the detection device 40 may be connected to the user terminal 30, and may transmit a detection result to, for example, the server 10 via the user terminal 30.

The hardware configurations of the server 10, the unmanned aerial vehicle 20, the user terminal 30, and the detection device 40 are not limited to the example of FIG. 1, and various kinds of hardware can be employed. For example, each of the server 10, the unmanned aerial vehicle 20, the user terminal 30, and the detection device 40 may include a reading device (e.g., memory card slot or optical disc drive) configured to read a computer-readable information storage medium, or may include an input/output device (e.g., USB port) for communicating to/from an external device. Further, for example, a program and data described as being stored into each the respective devices may be supplied via the reading device or input/output device, or may be supplied via the network N.

[1-2. Outline of Unmanned Aerial Vehicle Control System]

In this embodiment, a description is mainly given of flight control at the time of landing and takeoff of the unmanned aerial vehicle 20. The term "landing" means that the unmanned aerial vehicle 20 lands on the ground. "Landing" can also be referred to as "touching the ground", and for example, means that the propeller completely stops without the vehicle body falling down. "Landing" means both of the fact that the vehicle body directly lands on the ground and the fact that the vehicle body lands on an object such as a sheet or a building.

The term "takeoff" means that the unmanned aerial vehicle 20 flies away from the ground to float in the air. "Takeoff" may mean that the unmanned aerial vehicle 20 flies away from the ground, or may mean that the vehicle body becomes stable or rises to a predetermined altitude after the takeoff. The unmanned aerial vehicle control system 1 may execute only flight control at the time of any one of landing and takeoff.

FIG. 2 is a diagram for illustrating a situation in which the unmanned aerial vehicle 20 lands. As illustrated in FIG. 2, in this embodiment, a port P is arranged on the ground, and the detection device 40 is arranged near the port P. In FIG. 2, only one detection device 40 is illustrated, but a plurality of detection devices 40 may be arranged so as to surround the port P. Further, a communication device, for example, a Wi-Fi access point, may be arranged near the port P.

The port P is a location prepared for at least one of landing or takeoff. In this embodiment, a description is given of a case in which the port P is used at the time of both of landing and takeoff. However, the port P dedicated for landing and the port P dedicated for takeoff may be separately prepared. For example, the port P may be a fixed one such as a concrete foundation or a building rooftop, or may be a portable one such as a mat, a sheet, or a plate. The usable unmanned aerial vehicle 20 may be determined in advance for the port P, and for example, the usage time may be determined in advance for each of the plurality of unmanned aerial vehicles 20.

For example, the detection device 40 is arranged at such a position that apart or all of the port P falls within its detection range. In other words, the position and direction of the detection device 40 are determined so as to enable detection of a part or all of the port P. The detection range is a range that can be detected by the detection device 40. In this embodiment, the detection device 40 is a camera, and thus the detection range is a range (within field angle) to be photographed by a camera. When the detection device 40 is an infrared sensor, an ultrasonic sensor, or the like, the detection range is a range that an infrared ray, an ultrasound, or the like can reach.

In this embodiment, a description is given of a case in which the detection range of the detection device 40 includes the port P and its surroundings. However, the photographing range may only be inside the port P. The surroundings are a region around the port P, and are, for example, a region outside the port P, which is away from the port P by a distance smaller than a predetermined distance. In this embodiment, a description is given of a case in which a region (namely, part of the photographed image in which the port P is not shown) excluding the port P corresponds to the surroundings within the detection range of the detection device 40. However, only a part of the region may correspond to the surroundings.

For example, when the unmanned aerial vehicle 20 moves toward the port P, the user waits for arrival of the unmanned aerial vehicle 20 at a position near the port P or away from the port P by a predetermined distance or more. In this embodiment, an application (hereinafter described as "flight management app") for notifying of, for example, the current position of the unmanned aerial vehicle 20 is installed on the user terminal 30, and the user activates the flight management app to grasp the flight situation of the unmanned aerial vehicle 20.

For example, on the flight management app, the current position of the unmanned aerial vehicle 20 may be tracked in real time, or the user may be notified of the predicted arrival time of the unmanned aerial vehicle 20. Further, for example, as in a second embodiment of the present invention described later, when the unmanned aerial vehicle 20 has flown to a position away from the port P by a distance smaller than a predetermined di stance (e.g., 100 meters), the user may be notified of, for example, a message notifying of whether the unmanned aerial vehicle 20 is permitted to land, for example.

The unmanned aerial vehicle 20 may fly without particularly holding a package, for example. However, in this embodiment, the unmanned aerial vehicle 20 flies to the port P with the package. The package is an object to be delivered, and is an object that the unmanned aerial vehicle 20 delivers from a departure location to a destination location. The package is also sometimes referred to as "baggage". For example, the package is a product ordered by the user, a mail to the user, or a material or tool to be used by the user at work.

For example, the unmanned aerial vehicle 20 includes a holding member (e.g., receiver, cage, or container) for holding a package, and delivers the package held by the holding member. The user may operate the unmanned aerial vehicle 20. However, in this embodiment, the unmanned aerial vehicle 20 autonomously flies on a predetermined path, and autonomously flies also at the time of both of landing and takeoff.

The term "autonomously" means that the computer mainly flies the unmanned aerial vehicle 20, and the user does not mainly fly the unmanned aerial vehicle 20. The term "autonomously" also includes a case in which the operation performed by the user is not considered at all, and a case in which the operation performed by the user is considered auxiliary. In this embodiment, the server 10 sets the path of the unmanned aerial vehicle 20, and the server 10 and the unmanned aerial vehicle 20 communicate to/from each other, so that the unmanned aerial vehicle 20 flies autonomously. Various kinds of methods can be applied as the autonomous flight itself, and for example, an autonomous flight algorithm using GPS may be used. Further, the autonomous flight algorithm is set in the unmanned aerial vehicle 20, and the unmanned aerial vehicle 20 may fly without particularly communicating to/from the server 10.

As illustrated in FIG. 2, the port P includes a markM (circle containing a character of "H" in FIG. 2) serving as a sign of landing and takeoff. For example, the mark M can also be used as a target position at the time of landing, or the mark M can also be used as a position at which the unmanned aerial vehicle 20 is to be arranged at the time of takeoff. The mark M is only required to be information that can be detected by the photographing device 24 or the sensor group 25 of the unmanned aerial vehicle 20, and instead of a character, the mark M may be an image such as a logo or an illustration.

For example, the collection location of a package is set as the departure location of the unmanned aerial vehicle 20, and the position of the port P is set as the destination location. The server 10 calculates a flight route from the collection location to the port P, and the unmanned aerial vehicle 20 flies to the air above the port P in an autonomous flight mode based on the flight route. When the unmanned aerial vehicle 20 has arrived at the air above the port P, the unmanned aerial vehicle 20 transitions to a landing mode for landing at the port P. When the unmanned aerial vehicle 20 has transitioned to the landing mode, the unmanned aerial vehicle 20 uses the photographing device 24 or the sensor group 25 to detect the mark M.

Publicly known methods can be applied as the method of detecting the mark M itself, and for example, the unmanned aerial vehicle 20 uses pattern matching, a convolutional neural network, or the like to detect the mark M based on the image picked up by the photographing device 24. Further, for example, the unmanned aerial vehicle 20 uses, for example, an infrared sensor or an ultrasound sensor of the sensor group 25 to detect the mark M.

The unmanned aerial vehicle 20 gradually lowers its altitude so as to approach the detected mark M. The unmanned aerial vehicle 20 stops rotation of the propeller when landing at the port P. In this case, a notification to the effect that landing is complete may be transmitted to the flight management app of the user terminal 30. When the user has confirmed success of landing of the unmanned aerial vehicle 20, the user moves to the port P to retrieve a package. After the unmanned aerial vehicle 20 has landed, the unmanned aerial vehicle 20 may use an actuator to open the holding member, to thereby drop the package onto the port P and take off.

The unmanned aerial vehicle 20 may be hit by wind at the time of landing, and cannot always land on the mark M accurately. For example, when wind is blowing at the time of landing, the unmanned aerial vehicle 20 deviates from the mark M. Thus, when another package is arranged near the mark M, the unmanned aerial vehicle 20 may collide with the package and fall down. Further, for example, when a gust of wind is blowing at the time of landing, the unmanned aerial vehicle 20 may deviate to outside of the port P and collide with the user, for example. The same holds true to the time of takeoff of the unmanned aerial vehicle 20 from the port P, and the unmanned aerial vehicle 20 may be hit by wind to collide with the user, for example.

In view of the above, the unmanned aerial vehicle control system 1 detects the port P and an object near the port P based on the image picked up by the detection device 40, and controls landing and takeoff. As described in the "background art" section, when landing and takeoff are restricted forcibly irrespective of the type of the detected object, landing and takeoff are restricted more strictly than required, which means there is little flexibility. Therefore, the unmanned aerial vehicle control system 1 restricts landing and takeoff in accordance with the type of the object. Now, a description is given of control at the time of landing and control at the time of takeoff in order.

Figure 4:
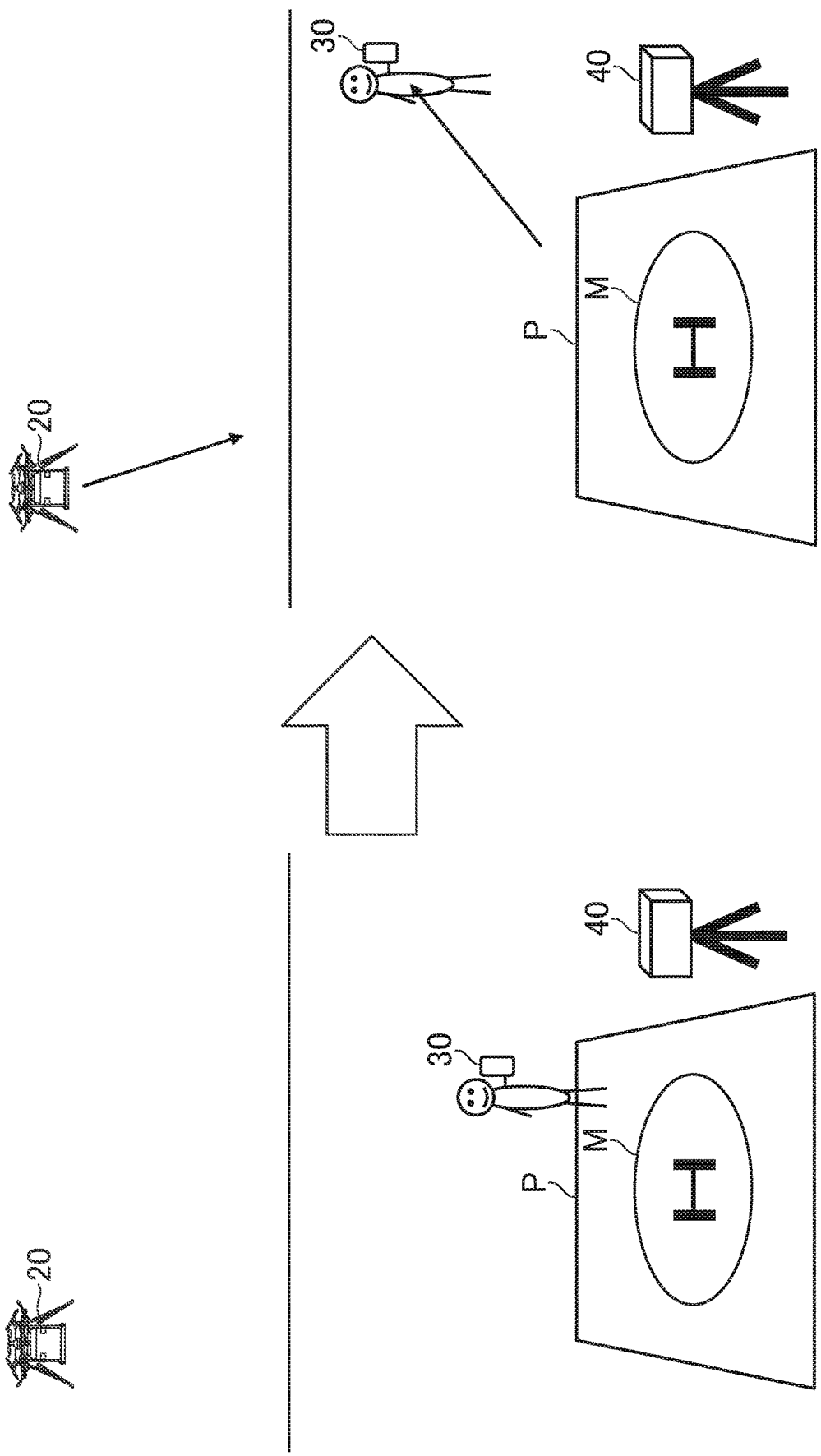
FIG. 4 is a diagram for illustrating a situation in which landing of the unmanned aerial vehicle is restricted.

FIG. 3 and FIG. 4 are diagrams for illustrating a situation in which landing of the unmanned aerial vehicle 20 is restricted. Although a reference symbol of "C" is assigned to the package in FIG. 3, this reference symbol is omitted when there is no particular necessity to refer to the drawings.

As illustrated in FIG. 3, when another package C is detected to be inside the port P, the unmanned aerial vehicle 20 is highly likely to collide with the package C, and thus the server 10 does not permit landing of the unmanned aerial vehicle 20. In this case, the server 10 causes the unmanned aerial vehicle 20 to hover and wait in the air. For example, when the user has recognized existence of the package C and removed the package C from the port P, the removal of the package C from the port P is detected, and the landing of the unmanned aerial vehicle 20 is permitted.

The user may move the package C to a location away from the port P. However, the size of the package C is smaller than that of a person or an automobile, and thus, even when the unmanned aerial vehicle 20 is hit by wind to deviate to outside of the port P, the unmanned aerial vehicle 20 is less likely to collide with the package C. Even when the unmanned aerial vehicle 20 deviates to outside of the port P and collides with the package C, the package C is not injured like a person or an animal, and there is no such fear that a driver of, for example, an automobile or a motorbike is surprised to steer a steering wheel. Thus, as long as the package C is moved to outside of the port P, it is considered that safety at the time of landing is sufficiently ensured.

Further, the port P is a location at which a package is to be received, and it is considered that a numerous number of packages are stacked near the location. Thus, when landing is restricted simply because the package C is near the port P, the numerous number of packages are required to be moved far away, which means there is little flexibility. Therefore, it is possible to save the labor of moving the package C far away to achieve both of safety and flexibility by permitting landing on condition that the package C is moved to outside of the port P (without moving the package C to a location away from the port P).

Further, as illustrated in FIG. 4, when the user is detected to be inside the port P, similarly to the case in which there is a package C inside the port P, landing of the unmanned aerial vehicle 20 is not permitted. The user is larger than the package C, and thus even in a case where the user is outside of the port P, when the user is near the port P and the unmanned aerial vehicle 20 is hit by a gust of wind, the possibility that the unmanned aerial vehicle 20 collides with the user is relatively high. Further, when the unmanned aerial vehicle 20 has collided with the user, there is a possibility that the user is hurt, resulting in a serious accident. Further, even in a case where the user moves out of the port P, when the user is near the port P, the user may enter the port P without recognizing existence of the unmanned aerial vehicle 20.

In view of the above, when the user is detected to be inside the port P, landing is permitted on condition that the user moves to a position (e.g., outside detection range of detection device 40) away from the port P by placing the maximum priority on safety. In this respect, when this case is compared with delivery of the package C from the port P, the user is simply required to move, which means that there is little burden on the user. Further, the user enters the port P in principle only when the user receives the package C, and thus even when such a restriction is set, it is considered that flexibility is hardly affected. Thus, in a case where the detected object is the user, even when a rigid restriction is set, it is possible to achieve both of safety and flexibility.

Next, a description is given of processing at the time of takeoff. The condition for permitting landing and the condition for permitting takeoff may be the same. However, in this embodiment, those conditions are set to be different from each other to improve safety and flexibility.

Figure 5:
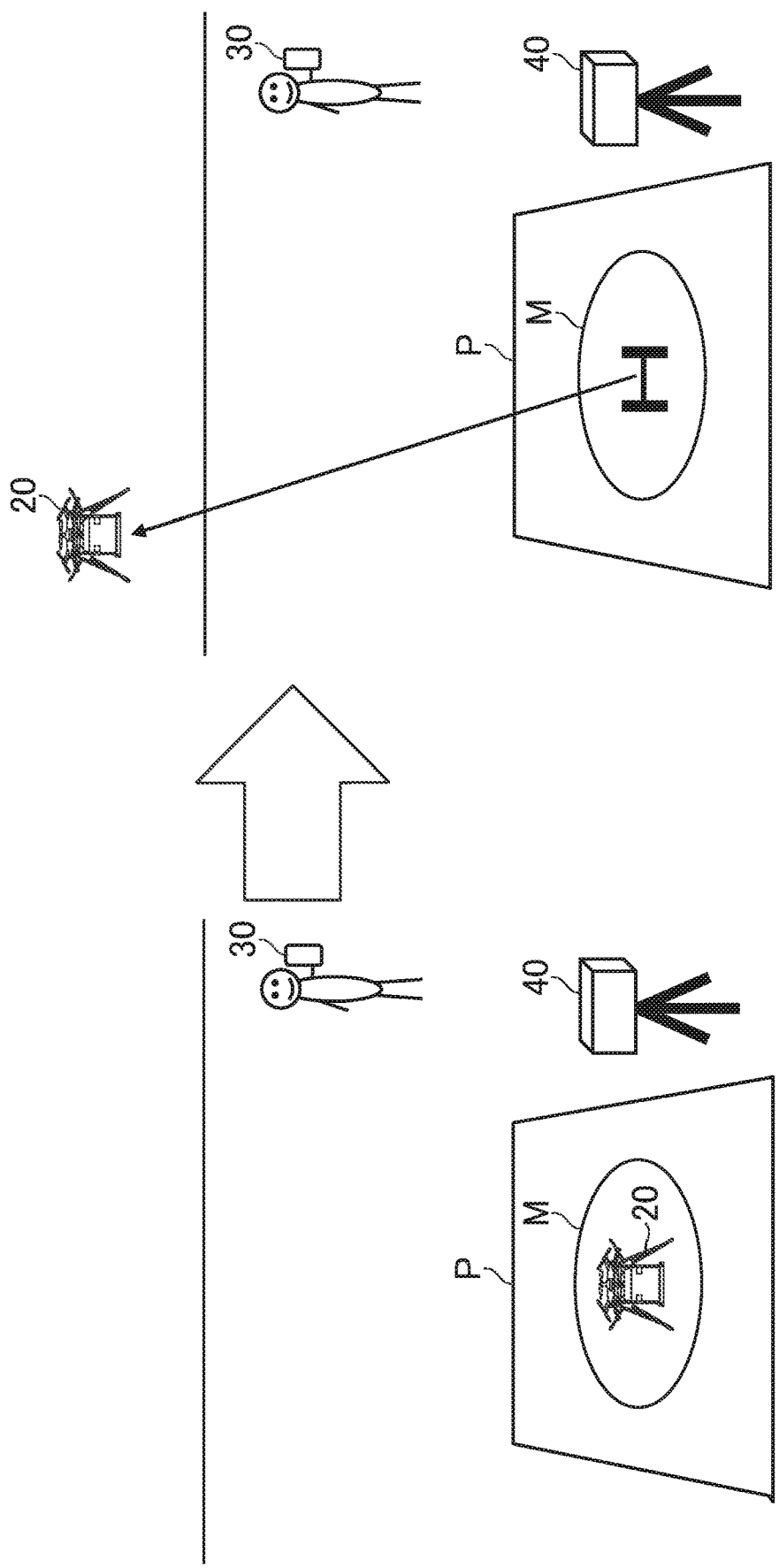
FIG. 5 is a diagram for illustrating a situation in which takeoff of the unmanned aerial vehicle is restricted.

FIG. 5 and FIG. 6 are diagrams for illustrating a situation in which takeoff of the unmanned aerial vehicle 20 is restricted. The unmanned aerial vehicle 20 may not only deliver a package to the port P, but also pick up a package in the port P, and deliver the package to another location. That is, the port P may not only be used as the destination location, but also be used as the departure location. Thus, as illustrated in FIG. 5, the unmanned aerial vehicle 20 may be on standby for takeoff under a state in which the package C is mounted on the unmanned aerial vehicle 20.

Under the state of FIG. 5, when the package C is detected to be inside the port P, the package is delivered by the unmanned aerial vehicle 20, and thus there is no obstacle for takeoff. Thus, unlike the case of landing, in a case where the unmanned aerial vehicle 20 takes off, even when there is the package C inside the port P, takeoff is permitted. When another package C is detected near the port P, it is considered that there is no interference for takeoff of the unmanned aerial vehicle 20 for a reason similar to that at the time of landing, and thus takeoff is permitted.

When a plurality of packages are detected to be inside the port P, another package is highly likely to be arranged near the unmanned aerial vehicle 20. In this case, the unmanned aerial vehicle 20 may be hit by wind immediately after takeoff and collide with another package. Thus, when a plurality of packages are detected to be inside the port P, takeoff may be restricted. However, when a plurality of packages are detected to be stored in the holding member of the unmanned aerial vehicle 20 in contact with one another, the unmanned aerial vehicle 20 delivers the plurality of packages at the same time. Thus, in such a case, takeoff may be permitted without restriction.

Further, as illustrated in FIG. 6, when the user is detected to be inside the port P, the unmanned aerial vehicle 20 may collide with the user, and thus takeoff is not permitted. Further, for the same reason as that at the time of landing, even in a case where the user moves outside of the port P, when the user is near the port P, the unmanned aerial vehicle 20 is highly likely to collide with the user, resulting in a possibility of leading to a serious accident. Thus, a condition similar to that at the time of landing is applied to the user, and takeoff is permitted on condition that the user moves to a position (e.g., outside photographing range of detection device 40) away from the port P. For the same reason as that at the time of landing, even when a strict restriction is set for the user, flexibility is hardly affected, and it is possible to achieve both of safety and flexibility.

In FIG. 3 to FIG. 6, a description has been given of the package and the user as an example. However, landing and landing may be restricted in accordance with the type of the object, and similar control may be performed for other types of objects. For example, when an animal such as a dog or a cat, an automobile, a motorbike, or the like is detected, the object may be treated similarly to the user. Further, for example, when a cart for carrying a package on the ground is detected, the object may be treated similarly to the package.

As described above, the unmanned aerial vehicle control system 1 according to this embodiment does not restrict landing and takeoff more strictly than required, but restricts landing and takeoff based on the type of an object in or near the port P, to thereby avoid restricting landing and takeoff when the object does not substantially influence safety, and achieve both of improvement in safety and improvement in flexibility. Now, a description is given in detail of this technology.

[1-3. Functions to be Implemented in Unmanned Aerial Vehicle Control System]

Figure 7:
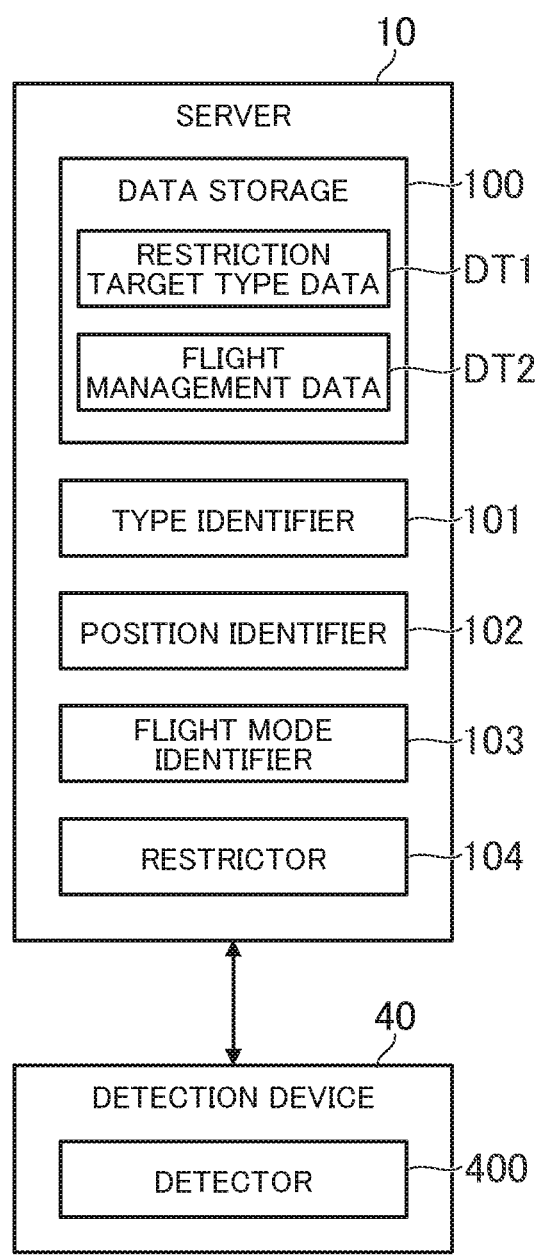
FIG. 7 is a functional block diagram for illustrating an example of functions to be implemented by the unmanned aerial vehicle control system.

FIG. 7 is a functional block diagram for illustrating an example of functions to be implemented by the unmanned aerial vehicle control system 1. As illustrated in FIG. 7, in the unmanned aerial vehicle control system 1, a detector 400, a data storage 100, a type identifier 101, a position identifier 102, a flight mode identifier 103, and a restrictor 104 are implemented. In this embodiment, a description is given of a case in which the detector 400 is implemented by the detection device 40, and other functions are implemented by the server 10.

[Detector]

The detector 400 is implemented by the detection device 40. The detector 400 is configured to detect an object existing at a location of at least one of landing or takeoff of the unmanned aerial vehicle 20. In this embodiment, although a description is given of a case in which the port P and a region near the port P correspond to the location, the location is only required to be a position at which at least one of landing or takeoff of the unmanned aerial vehicle 20 is performed. For example, the location may be a parking lot, a riverbed, a park, a garden of a house, or a rooftop of a building. That is, the location is not a location prepared only for landing and takeoff like the port P, and is usually used for other purposes. The location may also be a location to be used for landing and takeoff of the unmanned aerial vehicle 20 only at a specific time.

For example, an area for the unmanned aerial vehicle 20 to perform at least one of landing or takeoff is determined in advance as the above-mentioned location, and the detector 400 detects at least one of an object inside the area or an object near the area. In this embodiment, a description is given of a case in which the port P corresponds to the area. However, the port P is only required to be a predetermined area, and may be any area such as an area in which a mat or a sheet is set, an area sectioned by tapes, an area drawn with chalk or a color spray, an area surrounded by color cones (trademark), or an area surrounded by a fence.

The detector 400 is configured to output data indicating a result of detecting an object in or near the port P based on a detection signal of the detection device 40. In this embodiment, the detection device 40 is a camera, and thus the detector 400 generates and outputs a photographed image indicating a situation of the photographing range of the detection device 40. The photographed image has a meaning of not only a still image but also a moving image.

Figure 8:
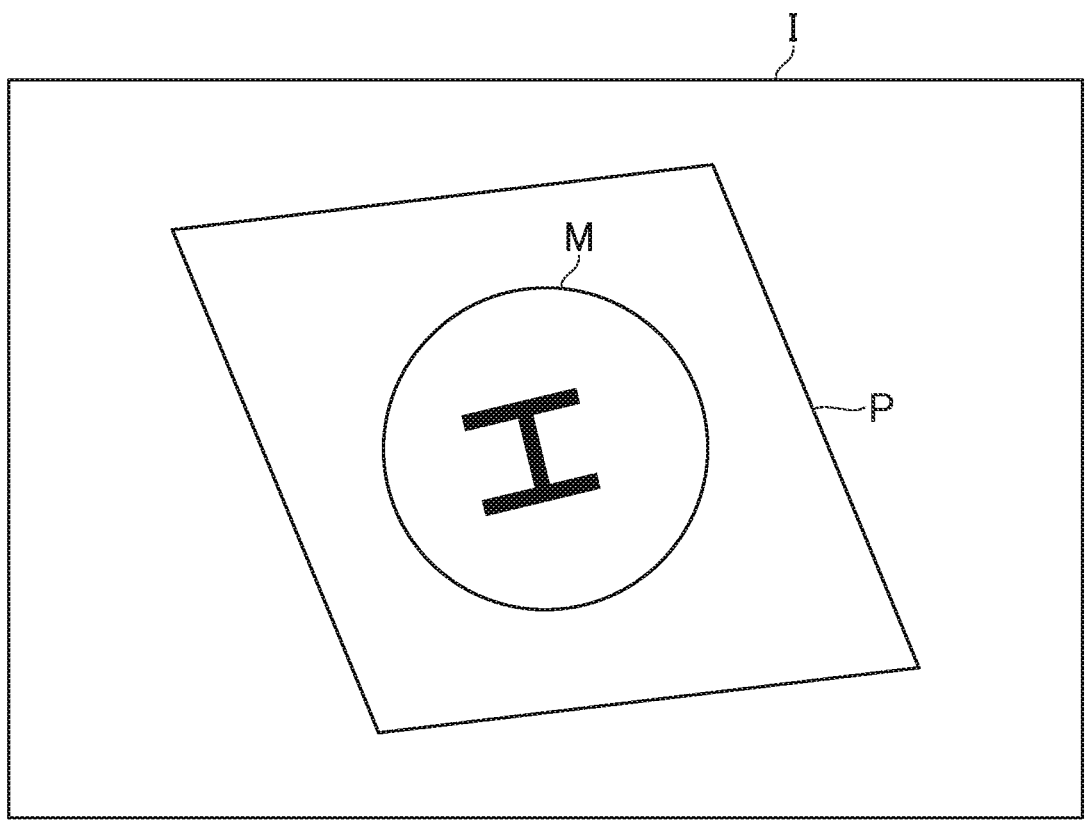
FIG. 8 is a diagram for illustrating a photographed image to be output by a detector.

FIG. 8 is a diagram for illustrating a photographed image to be output by the detector 400. The detection device 40 is arranged so as to include the port P and its surroundings in the photographing range, and thus, as illustrated in FIG. 8, the situation of the port P and its surroundings is illustrated in the photographed image I. For example, the surroundings of the port P are a region of a photographed part other than the port P in the photographed image I. The reference symbol of the photographed image I is omitted in the following.

Data indicating a result of detection by the detector 400 differs depending on, for example, a sensor to be used as the detection device 40. For example, when an infrared sensor is used, the detector 400 generates an infrared image measured by the detection device 40 being an infrared sensor. Further, for example, when a depth sensor is used, the detector 400 generates a depth image measured by the detection device 40 being a depth sensor. The depth image is an image indicating the depth (distance between depth sensor and object) of an object.

[Data Storage]

The data storage 100 is mainly implemented by the storage 12. The data storage 100 stores data for controlling the unmanned aerial vehicle 20. For example, the data storage 100 stores restriction target type data DT1 and flight management data DT2.

FIG. 9 is a table for showing an example of data storage of the restriction target type data DT1. The restriction target type data DT1 is data indicating a restriction target type. The restriction target type is a type of an object for which at least one of landing or takeoff is restricted at the time of detection. In other words, the restriction target type is a type of an object to be paid attention to at the time of at least one of landing or takeoff. For example, when at least one object of the restriction target type is detected, at least one of landing or takeoff is restricted. Details of the restriction target type data DT1 may be changed by, for example, an administrator.

In this embodiment, an object to be paid attention to is changed depending on the flight mode or the position of detecting an object, and thus, as shown in FIG. 9, the restriction target type is defined for each combination of the flight mode and the position of the object in the restriction target type data DT1. For example, the restriction target type data DT1 indicates whether each of a still object and a moving object corresponds to the restriction target type.

The still object is an object that does not move, and in principle, does not move unless the object receives a predetermined level or more of force from the outside. The still object can also be referred to as an object that does not have a dynamic force internally. For example, the still object is, for example, a package, a cart carrying a package on the ground, or the detection device 40. The moving object is an object that is moving, or an object that may move. The object that may move is an object that does not move at the current time point, but can move by its own force without receiving an external force. The moving object can also be referred to as an object that has a dynamic force internally. For example, the moving object is, for example, a human, an animal, an automobile, a motorbike, or a bicycle.

As shown in FIG. 9, for example, when the unmanned aerial vehicle 20 is in a landing mode, and the position of an object is inside the port P, the object corresponds to the restriction target type irrespective of whether the object is a still object or a moving object. Further, for example, when the unmanned aerial vehicle 20 is in the landing mode, and the position of an object is near the port P, the still object does not correspond to the restriction target type, and the moving object corresponds to the restriction target type.

Further, for example, when the unmanned aerial vehicle 20 is in a takeoff mode, and the position of an object is inside the port P, the still object does not correspond to the restriction target type, and the moving object corresponds to the restriction target type. Further, for example, when the unmanned aerial vehicle 20 is in the takeoff mode, and the position of an object is near the port P, the still object does not correspond to the restriction target type, and the moving object corresponds to the restriction target type.

In the example of data storage of FIG. 9, a description has been given of a case of indicating whether each of the still object and the moving object corresponds to the restriction target type. However, any type can be set as the restriction target type, and for example, the type may be divided within the still object, or may be divided within the moving object. Alternatively, for example, the restriction target type may be set not in terms of whether the object moves, but in terms of whether the object is a package or in terms of whether the object is an important package. Further, for example, the restriction target type may be set in terms of whether the object is a living thing.

FIG. 10 is a table for showing an example of data storage of the flight management data DT2. The flight management data DT2 is data for managing the unmanned aerial vehicle 20 during flight. As shown in FIG. 10, for example, the flight management data DT2 stores information such as an unmanned aerial vehicle ID for uniquely identifying an unmanned aerial vehicle 20, a destination location, a flight route, a current flight mode, and positional information indicating a current position.

The unmanned aerial vehicle ID is information such as individual identification information or an IP address of the unmanned aerial vehicle 20, and is stored in the storage 22 of the unmanned aerial vehicle 20, for example. The destination location is a position at which the unmanned aerial vehicle 20 is to land, and is, for example, latitude/longitude information or coordinate information on the port P. The flight route is path information on a path from the departure location to the destination location. The flight route may be set by using a predetermined route search algorithm such as a Dijkstra's algorithm or an A-star method based on the departure location and the destination location, or may simply be a straight line connecting the departure location and the destination location.

The current flight mode is a flight mode set for the unmanned aerial vehicle 20, and any one of a plurality of flight modes determined in advance is set as the current flight mode. Any mode can be applied as the flight mode, and in this embodiment, it is assumed that the autonomous flight mode, the landing mode, and the takeoff mode are prepared. However, there may be other flight modes, and for example, there may be an evacuation mode of evacuating to a predetermined position, an emergency landing mode of trying to land at the current location at the time of emergency, or a landing completion mode in which landing is complete.

The autonomous flight mode is a mode of flying on a flight route of the flight management data DT2, and is a flight mode that is applied to a period from takeoff in the takeoff mode until the landing mode becomes effective. In other words, the autonomous flight mode is a flight mode that is applied to a period since the unmanned aerial vehicle 20 flied into the air above the departure location until the unmanned aerial vehicle 20 arrives at the air above the destination location. The landing mode is a mode for the unmanned aerial vehicle 20 to land after the unmanned aerial vehicle 20 has arrived at the air above the destination location. The takeoff mode is a mode for the unmanned aerial vehicle 20 to take off under a state in which the unmanned aerial vehicle 20 has landed at the departure location.

The positional information is information on a position detected by the sensor group 25 of the unmanned aerial vehicle 20. The unmanned aerial vehicle 20 repeatedly detects positional information by the sensor group 25, and transmits the detected positional information to the server 10 together with its own unmanned aerial vehicle ID. The server 10 stores the positional information into a record storing the unmanned aerial vehicle ID among the records of the flight management data DT2. As a result, the positional information is kept in the latest state.

For example, before takeoff, the unmanned aerial vehicle 20 transmits, to the server 10, its own unmanned aerial vehicle ID, the current positional information (namely, positional information indicating position of departure location), and the destination location set to itself. The destination location may be input on a terminal connected to the unmanned aerial vehicle 20. Further, those pieces of information may be transmitted from the terminal to the server 10. The server 10 generates a flight route based on the received departure location and destination location, and stores those pieces of information into the flight management data DT2. In this embodiment, a description is given of a case in which the flight mode is set to the takeoff mode at this time point. However, the flight mode may be set to the takeoff mode when takeoff is permitted by the restrictor 104 described later.

After that, when takeoff is permitted by the restrictor 104, the server 10 transmits information such as a movement direction or a movement speed to the unmanned aerial vehicle 20 together with a takeoff instruction. When the unmanned aerial vehicle 20 has received those pieces of information, the unmanned aerial vehicle 20 controls rotation of the propeller to take off. When the unmanned aerial vehicle 20 has risen to a given altitude, the unmanned aerial vehicle 20 notifies the server 10 of that fact, and changes the flight mode to the autonomous flight mode. At the time of takeoff, the unmanned aerial vehicle 20 may take off not in response to an instruction from the server 10 but by its own decision. After that, the server 10 and the unmanned aerial vehicle 20 transmit, for example, positional information to each other, to thereby implement autonomous flight to the air above the destination location.

When the unmanned aerial vehicle 20 has moved to the air above the destination location (e.g., when distance between positional information and destination location is smaller than threshold value), the flight mode is set to the landing mode. The flight mode may be set to the landing mode when landing is permitted by the restrictor 104 described later. After that, when landing is permitted by the restrictor 104, the server 10 transmits information such as the movement direction or the movement speed to the unmanned aerial vehicle 20 together with a landing instruction. At the time of landing, the unmanned aerial vehicle 20 may land not in response to an instruction from the server 10, but by its own decision. When the unmanned aerial vehicle 20 has detected landing by, for example, a pressure sensor of the sensor group 25, rotation of the propeller is stopped and landing is complete. In this case, the unmanned aerial vehicle 20 may notify the server 10 of the fact that landing is complete, and store that fact into the flight management data DT2.

[Type Identifier]

The type identifier 101 is mainly implemented by the controller 11. The type identifier 101 is configured to identify the type of an object based on a result of detection by the detector 400. As described above, various kinds of methods can be applied as the object detection method itself, and the type identifier 101 may identify the type of an object by a method that depends on a detection method to be used.

For example, when a camera is used as in this embodiment, the type identifier 101 identifies the type of an object based on the photographed image generated by the detector 400. For example, pattern data that defines a pattern such as the shapes and colors of various objects is prepared, and the type identifier 101 executes pattern matching for the photographed image based on the pattern data to detect an object. Further, for example, machine learning, for example, a convolutional neural network, may be used, and the type identifier 101 may use a learner (learner that classifies type of object) created based on training data indicating features of various objects to identify the type of an object contained in the photographed image.

Further, for example, when an infrared sensor is used, the type identifier 101 identifies the type of an object based on an infrared image generated by the detector 400. In this case, similarly to the case of using a camera, the type identifier 101 uses pattern matching or machine learning to identify the type of an object contained in the infrared image. Further, for example, when a depth sensor is used, the type identifier 101 identifies the type of an object based on a depth image generated by the detector 400. In the depth image, it is possible to identify a contour of an object by identifying an edge portion having a large difference in depth. Thus, the type identifier 101 extracts a contour line from the depth image, and identifies the type of an object based on the features of the shape and size of the contour line.

In this embodiment, the type identifier 101 identifies, as the type, whether the object is a still object that is still, or a moving object that is moving or is movable. For example, the type classified as a still object and the type classified as a moving object are defined in the data storage 100 in advance, and the type identifier 101 may determine to which one of the still object or the moving object the type identified based on the result of detection by the detector 400 belongs. For example, in a case where the package is defined as a still object, and a person, an animal, and a vehicle are defined as a moving object, the type identifier 101 identifies the object as a still object when the type identified based on, for example, the photographed image is the package. Meanwhile, the type identifier 101 identifies the object as a moving object when the type is a person, an animal, or a vehicle.

Further, for example, the type identifier 101 may identify whether the object is a still object or a moving object based on a change in result of detection by the detector 400. For example, when a camera is used, the still object does not move in principle, and thus the photographed image, which is picked up continuously, does not change. Meanwhile, the moving object moves, and thus change occurs in the photographed image. Thus, the type identifier 101 may identify whether the object is a still object or a moving object based on the change in photographed image. The type identifier 101 uses change in infrared image or change in depth image to identify whether the object is a still object or a moving object also when an infrared sensor or a depth sensor is used.

In this embodiment, the unmanned aerial vehicle 20 can carry a package, and thus the type identifier 101 may identify, as the type, whether the object is a package or an object other than a package. For example, when a camera is used, a shape, a color, or the like of a package, a box, or the like is defined in pattern data, and the type identifier 101 executes pattern matching for the photographed image based on the pattern data to identify whether the object is a package or an object other than a package. That is, when the photographed image matches the pattern data, the type identifier 101 determines the type of an object as a package. Meanwhile, when the photographed image does not match the pattern data, the type identifier 101 determines the type of an object as an object other than a package. Further, for example, a learner for machine learning may learn features including the shape, the color, or the like of a package, a box, or the like based on training data storing an image of the package, the box, or the like, and the type identifier may input the photographed image into the learner to acquire whether a package is output as a classification result. Also when an infrared sensor or a depth sensor is used, the type identifier 101 identifies whether the object is a package or an object other than a package based on features of the infrared image or the depth image.

[Position Identifier]

The position identifier 102 is mainly implemented by the controller 11. The position identifier 102 is configured to identify the position of an object. The position identifier 102 identifies the position of an object based on a result of detection by the detector 400. The position of an object may be detected by a method that depends on the object detection method. When a camera is used as in this embodiment, the type identifier 101 analyzes the photographed image to detect an object, and thus the position identifier 102 may acquire a position (position of pixel at which object is detected in photographed image of FIG. 8) at which an object is detected in the photographed image. Also when an infrared sensor or a depth sensor is used, the position identifier 102 may similarly acquire the position at which an object is detected in the infrared image or the depth image.

In this embodiment, the port P is determined in advance as an area for enabling the unmanned aerial vehicle 20 to perform at least one of landing or takeoff, and thus the position identifier 102 identifies whether the position is inside the port P or near the port P. For example, the position (e.g., region in photographed image) of the port P is defined in the data storage 100 in advance, and the position identifier 102 determines whether the identified position is contained inside the port P. The position of the port P may not be defined in advance, but the position of the port P may be identified based on the result of detection by the detector 400. In this case, similarly to the method of detecting the type of an object, pattern matching, a convolutional neural network, or the like may be used to identify the position of the port P in the photographed image.

In this embodiment, the restriction target type is set in accordance with the position identified by the position identifier 102. A relationship between the position of the object and the restriction target type is defined in the data storage 100, and the restriction target type associated with the position identified by the position identifier 102 is set. In this embodiment, this relationship is defined in the restriction target type data DT1. For example, when the position of an object is identified to be inside the port P by the position identifier 102, the restriction target type corresponding to "inside port P" is set. Meanwhile, when the position of the object is identified to be near the port P by the position identifier 102, the restriction target type corresponding to "near port P" is set.

In the example of data storage of FIG. 9, when the position of an object is identified to be inside the port P by the position identifier 102, all the types are set as the restriction target type in the landing mode. Meanwhile, in the takeoff mode, the still object is not set as the restriction target type, and the moving object is set as the restriction target type. Meanwhile, when the position of the object is identified to be near the port P by the position identifier 102, the moving object is set as the restriction target type irrespective of the flight mode.

[Flight Mode Identifier]

The flight mode identifier 103 is mainly implemented by the controller 11. In this embodiment, the unmanned aerial vehicle 20 flies based on any one of the plurality of flight modes, and the flight mode identifier 103 identifies the flight mode of the unmanned aerial vehicle 20. In this embodiment, the flight mode is stored in the flight management data DT2. As described above, the flight mode is updated appropriately in accordance with the flight situation, for example, the current position of the unmanned aerial vehicle 20, and thus the flight mode identifier 103 refers to the flight mode stored in the data storage 100.

For example, the restriction target type is set in accordance with the flight mode. A relationship between the flight mode and the restriction target type is defined in the data storage 100, and the restriction target type associated with the flight mode identified by the flight mode identifier 103 is set. In this embodiment, this relationship is defined in the restriction target type data DT1. For example, when the mode is identified to be the landing mode by the flight mode identifier 103, the restriction target type corresponding to the landing mode is set. Meanwhile, when the mode is identified to be the takeoff mode by the flight mode identifier 103, the restriction target type corresponding to the takeoff mode is set.

As described above, the restriction target type is set in accordance with which one of landing and takeoff is to be performed by the unmanned aerial vehicle 20. In this embodiment, a description is given of a case of identifying which one of landing and takeoff is to be performed based on the flight mode. However, which one of landing and takeoff is to be performed may not particularly be identified based on the flight mode, but may be identified by other methods. For example, when the unmanned aerial vehicle 20 during flight has arrived at the destination location (e.g., the air above port P), landing may be identified. Further, for example, when the destination location, the flight route, or the like is set under a state in which the propeller of the unmanned aerial vehicle 20 does not rotate, takeoff may be identified. The restriction target type is not required to be completely different between landing and takeoff, and it suffices that at least a part thereof is different therebetween.

In the example of data storage of FIG. 9, in a case where the landing mode is identified by the flight mode identifier 103 (that is, when the unmanned aerial vehicle 20 lands), all the types are set as the restriction target type when the object is inside the port, and the moving object is set as the restriction target type when the object is near the port. Meanwhile, when the takeoff mode is identified by the flight mode identifier 103 (that is, when the unmanned aerial vehicle 20 takes off), the moving object is set as the restriction target type irrespective of the position of the object.

[Restrictor]

The restrictor 104 is mainly implemented by the controller 11. The restrictor 104 restricts at least one of landing or takeoff of the unmanned aerial vehicle 20 based on the type identified by the type identifier 101. In this embodiment, the restrictor 104 performs processing for both of landing and takeoff. However, the restrictor 104 may perform processing for only any one of landing and takeoff.

The term "restrict landing" refers to preventing landing or not permitting landing. For example, the term "restrict landing" corresponds to causing the unmanned aerial vehicle 20 to hover and wait at the current location, preventing the mode from transitioning to the landing mode, causing the unmanned aerial vehicle 20 to increase its altitude, preventing the rotation speed of the propeller from decreasing, maintaining the rotation speed of the propeller at a threshold value or more, or causing the unmanned aerial vehicle 20 to move in a direction away from the port P.

The term "restrict takeoff" refers to preventing takeoff or not permitting takeoff. For example, the term "restrict takeoff" corresponds to causing the unmanned aerial vehicle 20 to stay on the ground, preventing the mode from transitioning to the takeoff mode, preventing the unmanned aerial vehicle 20 from increasing its altitude, preventing the rotation speed of the propeller from increasing, maintaining the rotation speed of the propeller at a speed lower than the threshold value, or causing the unmanned aerial vehicle 20 to stay on the port P.

In this embodiment, the restriction target type is set, and thus when the type identified by the type identifier 101 is a predetermined restriction target type, the restrictor 104 restricts at least one of landing or takeoff of the unmanned aerial vehicle. For example, the restrictor 104 determines whether the type identified by the type identifier 101 is the restriction target type, to thereby restrict landing and takeoff of the unmanned aerial vehicle 20. In this embodiment, in a case where at least one object corresponding to the restriction target type has been detected, the restrictor 104 restricts landing and takeoff of the unmanned aerial vehicle 20 even when other detected objects do not correspond to the restriction target type.

In this embodiment, the restriction target type at the time of landing and the restriction target type at the time of takeoff are different from each other. Thus, for example, when the unmanned aerial vehicle 20 lands, the restrictor 104 determines whether the type identified by the type identifier 101 is the restriction target type at the time of landing, and when the type is determined to be the restriction target type at the time of landing, the restrictor 104 restricts landing of the unmanned aerial vehicle 20. Further, for example, when the unmanned aerial vehicle 20 is in the takeoff mode, the restrictor 104 determines whether the type identified by the type identifier 101 is the restriction target type at the time of takeoff, and when the type is determined to be the restriction target type at the time of takeoff, the restrictor 104 restricts takeoff of the unmanned aerial vehicle 20.

The restrictor 104 restricts at least one of landing or takeoff of the unmanned aerial vehicle 20 based on which one of a still object and a moving object the object identified by the type identifier 101 is. For example, in a case where the object identified by the type identifier 101 is a still object, the restrictor 104 restricts landing of the unmanned aerial vehicle 20 when the object is inside the port P. Meanwhile, the restrictor 104 permits landing of the unmanned aerial vehicle 20 without restriction when the object is near the port P. Further, for example, when the object identified by the type identifier 101 is a moving object, landing of the unmanned aerial vehicle 20 is restricted irrespective of the position of the object. Further, for example, when the object identified by the type identifier 101 is a still object, takeoff of the unmanned aerial vehicle 20 is permitted without restriction irrespective of the position of the object. Further, for example, when the object identified by the type identifier 101 is a still object, takeoff of the unmanned aerial vehicle 20 is restricted irrespective of the position of the object.

Further, for example, at least one of landing or takeoff of the unmanned aerial vehicle may be restricted based on which one of a package and an object other than a package the object identified by the type identifier 101 is. For example, in a case where the object identified by the type identifier 101 is a package, the restrictor 104 restricts landing of the unmanned aerial vehicle 20 when the package is inside the port P. Meanwhile, the restrictor 104 permits landing of the unmanned aerial vehicle 20 without restriction when the package is near the port P. Further, for example, when the object identified by the type identifier 101 is an object other than a package, the restrictor 104 restricts landing of the unmanned aerial vehicle 20 irrespective of the position of the object.

Further, for example, when the object identified by the type identifier 101 is a package, the restrictor 104 permits takeoff of the unmanned aerial vehicle 20 without restriction irrespective of the position of the package. Further, for example, when the object identified by the type identifier 101 is an object other than a package, the restrictor 104 restricts takeoff of the unmanned aerial vehicle 20 irrespective of the position of the object.

In this embodiment, the restrictor 104 restricts at least one of landing or takeoff of the unmanned aerial vehicle 20 based further on the position identified by the position identifier 102. For example, it is assumed that a position at which landing of the unmanned aerial vehicle 20 is required to be restricted and a position at which takeoff of the unmanned aerial vehicle 20 is required to be restricted are defined in the data storage 100.

The restrictor 104 determines whether the position identified by the position identifier 102 is a position at which landing is required to be restricted, and when the position identified by the position identifier 102 is a position at which landing is required to be restricted, the restrictor 104 restricts landing of the unmanned aerial vehicle 20. The restrictor 104 determines whether the position identified by the position identifier 102 is a position at which takeoff is required to be restricted, and when the position identified by the position identifier 102 is determined to be a position at which takeoff is required to be restricted, the restrictor 104 restricts takeoff of the unmanned aerial vehicle 20.

In this embodiment, an area inside the port P and an area near the port P are distinguished from each other, and thus the restrictor 104 restricts at least one of landing or takeoff of the unmanned aerial vehicle based on whether the object identified by the type identifier 101 is inside the port P or near the port P. For example, the restrictor 104 determines whether the position identified by the position identifier 102 is inside the port P. For example, when the position is inside the port P, the restrictor 104 restricts landing irrespective of the type of the object. Further, for example, in a case where the position is near the port P, the restrictor 104 permits landing without restriction when the object is a still object. Meanwhile, the restrictor 104 restricts landing when the object is a moving object.

In this embodiment, the unmanned aerial vehicle 20 can carry a package, and the restriction target type may be a package. In a case where the unmanned aerial vehicle 20 is in the takeoff mode, even when the type identifier 101 has identified a package, the restrictor 104 does not restrict takeoff of the unmanned aerial vehicle 20. Meanwhile, in a case where the unmanned aerial vehicle 20 is in the landing mode, when the type identifier 101 has identified a package, the restrictor 104 restricts landing of the unmanned aerial vehicle 20.

[1-4. Processing to be Executed in Unmanned Aerial Vehicle Control System]

Next, a description is given of processing to be executed in the unmanned aerial vehicle control system 1. Now, a description is given of processing of the server 10 to be executed in each of landing and takeoff. The processing described below is executed by the controller 11 operating in accordance with a program stored in the storage 12. The processing described below is an example of processing of the functional blocks illustrated in FIG. 7.

[Processing at Time of Landing]

Figure 11:
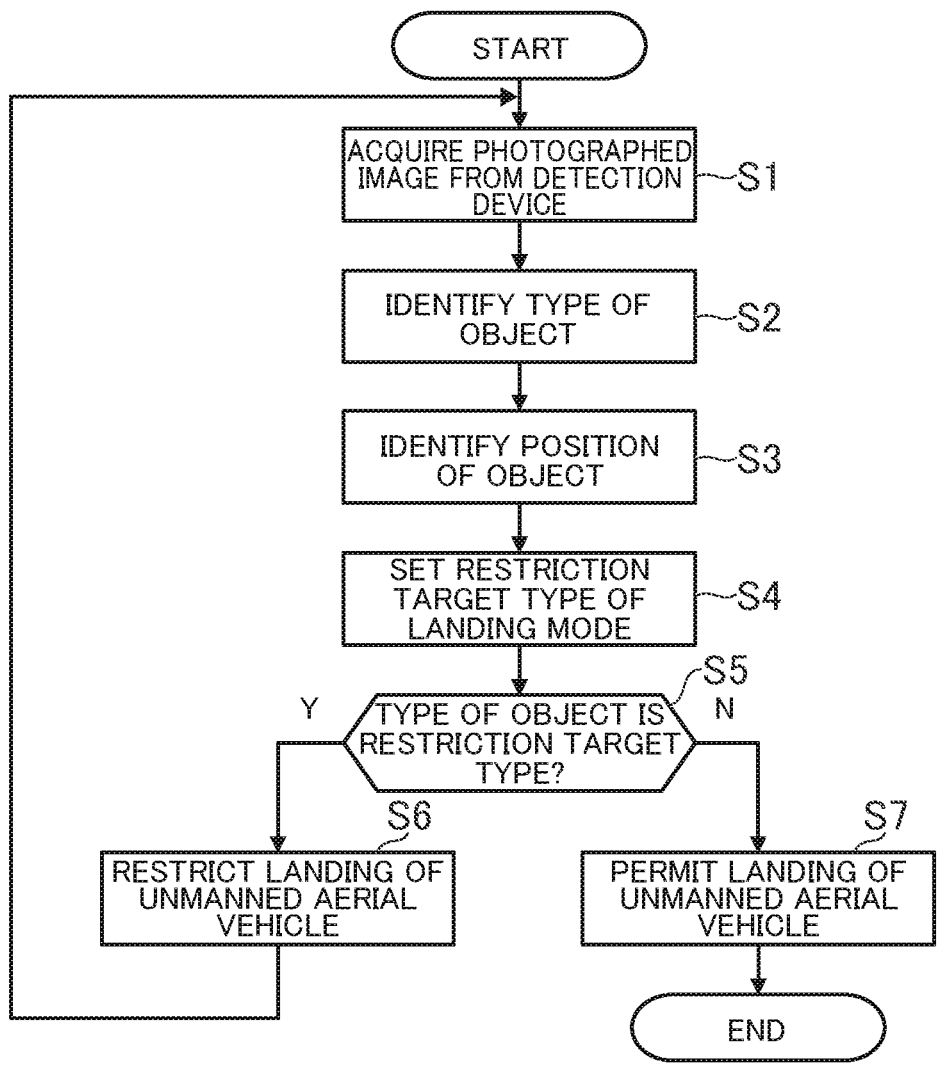
FIG. 11 is a flowchart for illustrating an example of processing to be executed at the time of landing.

FIG. 11 is a flowchart for illustrating an example of processing to be executed at the time of landing. The processing of FIG. 11 is executed when the flight mode becomes the landing mode. As illustrated in FIG. 11, first, the controller 11 of the server 10 acquires a photographed image from the detection device 40 (Step S1). In Step S1, the detection device 40 continuously photographs an image based on a predetermined frame rate, and transmits the photographed image to the server 10. The server 10 receives the photographed image transmitted from the detection device 40.

The controller 11 identifies the type of the object based on the photographed image acquired in Step S1 (Step S2). In Step S2, the controller 11 uses pattern matching or a convolutional neural network to detect an object contained in the photographed image, and identifies the type of the object.

The controller 11 identifies the position of the object whose type is identified in Step S2 (Step S3). In Step S3, the controller 11 identifies the position at which the object is detected in the photographed image. For example, when the position in the photographed image is indicated by two-dimensional coordinates in a screen coordinate system with the left top of the photographed image serving as a limit, in Step S2, the two-dimensional coordinates indicating the position at which the object is detected in Step S2 are identified.

The controller 11 sets the restriction target type of the landing mode, which depends on the position of the object identified in Step S3, based on the restriction target type data DT1 (Step S4). In Step S4, the controller 11 determines whether the position in the photographed image identified in Step S3 is in the port P. The position of the detection device 40 is fixed in advance, and a region in which the port P appears in the photographed image is known in advance.

Thus, the controller 11 determines whether the two-dimensional coordinates indicating the position of the object identified in Step S3 is contained in the region. Then, when the position of the identified object is determined to be inside the port P, the controller 11 sets both of the still object and the moving object as the restriction target type. Meanwhile, when the position of the identified object is determined to be near the port P, the controller 11 sets the moving object as the restriction target type.

The controller 11 determines whether the type of the object is the restriction target type set in Step S4 (Step S5). In Step S5, when the position of the object is in the port P, the controller 11 determines the type of the object as the restriction target type irrespective of the type identified in Step S3. Further, when the position of the object is near the port P and the type identified in Step S3 is a moving object, the controller 11 determines the type of the object as the restriction target type.

When the type of the object is determined to be the restriction target type (Step S5: Y), the controller 11 restricts landing of the unmanned aerial vehicle 20 (Step S6). In Step S6, the controller 11 transmits, to the unmanned aerial vehicle 20, an instruction to hover at the current location. When the unmanned aerial vehicle 20 has received the instruction, the unmanned aerial vehicle 20 hovers at the current location and waits for landing.

On the contrary, when the type of the object is not determined to be the restriction target type (Step S5: N), the controller 11 permits landing of the unmanned aerial vehicle 20 (Step S7), and this processing is finished. In Step S7, the controller 11 transmits an instruction to the effect that landing is permitted to the unmanned aerial vehicle 20. When the unmanned aerial vehicle 20 has received the instruction, the unmanned aerial vehicle 20 detects the mark M in the port P based on a detection signal of the photographing device 24 or the sensor group 25, and moves so as to approach the mark M, and then lands.

[Processing at the Time of Takeoff]

Figure 12:
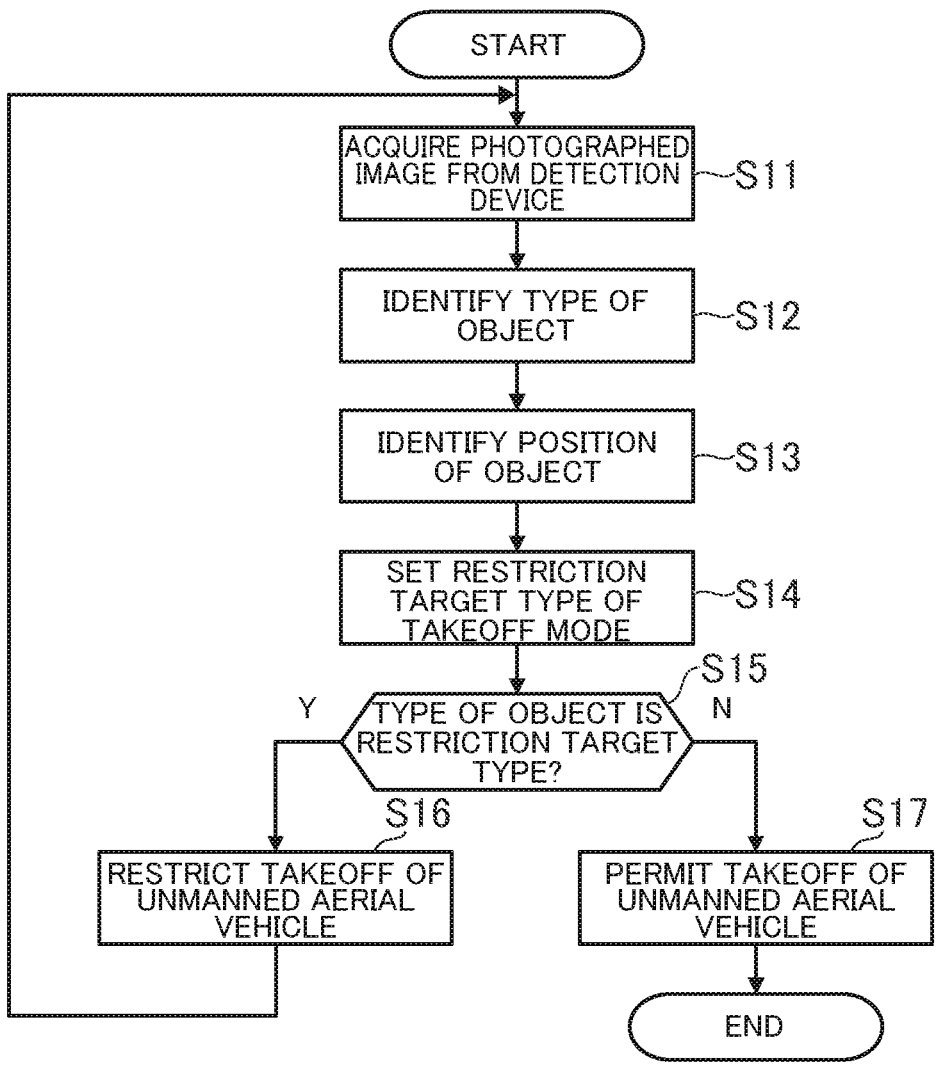
FIG. 12 is a flowchart for illustrating an example of processing to be executed at the time of takeoff.

FIG. 12 is a flowchart for illustrating an example of processing to be executed at the time of takeoff. The processing of FIG. 12 is executed when the flight mode becomes the takeoff mode. As illustrated in FIG. 12, the processing procedures of Step S11 to Step S13 are similar to the processing procedures of Step S1 to Step S3, respectively.

The controller 11 sets the restriction target type of the takeoff mode, which depends on the position of the object identified in Step S12, based on the restriction target type data DT1 (Step S14). The processing of Step S14 is substantially similar to the processing of Step S4, but is different from Step S4 in that the restriction target type corresponding to the takeoff mode in the restriction target type data DT1 is referred to. In this case, the moving object is set as the restriction target type irrespective of the position of the object, but the restriction target type that depends on the position of the object may be set also at the time of takeoff.

The controller 11 determines whether the type of the object is the restriction target type (Step S15). In Step S15, when the type of the object is a still object, the controller 11 determines that the type of the object is not the restriction target type. Meanwhile, when the type of the object is a moving object, the controller 11 determines that the type of the object is the restriction target type.

When the type of the object is determined to be the restriction target type (Step S15: Y), the controller 11 restricts takeoff of the unmanned aerial vehicle 20 (Step S16). In Step S16, the controller 11 does not transmit, to the unmanned aerial vehicle 20, an instruction to rotate the propeller.

On the contrary, when the type of the object is not determined to be the restriction target type (Step S15: N), the controller 11 permits takeoff of the unmanned aerial vehicle 20 (Step S17), and this processing is finished. In Step S17, the controller 11 transmits an instruction to the effect that takeoff is permitted to the unmanned aerial vehicle 20. When the unmanned aerial vehicle 20 has received the instruction, the unmanned aerial vehicle 20 rotates the propeller to take off.

According to the unmanned aerial vehicle control system 1 of the first embodiment, landing and takeoff are not restricted more strictly than required, but are restricted based on the type of an object in or near the port P, to thereby achieve both of improvement in safety and improvement in flexibility without restricting landing and takeoff when the object does not substantially influence safety.

Further, landing and takeoff of the unmanned aerial vehicle 20 are controlled based on whether an object in or near the port P is a still object or a moving object. For example, when the object is a still object, which is less likely to collide and has a relatively small influence at the time of collision, flexibility is ensured without restricting landing and takeoff. Meanwhile, when the object is a moving object, which is more likely to collide and has a relatively large influence at the time of collision, safety is ensured by restricting landing and takeoff. It is thus possible to achieve both of improvement in safety and improvement in flexibility more effectively.

Further, landing and takeoff of the unmanned aerial vehicle 20 are controlled based on whether an object in or near the port P is a package or an object other than a package. For example, when the object is a package, which is less likely to collide and has a relatively small influence at the time of collision, flexibility can be ensured without restricting landing and takeoff. Meanwhile, when the object is an object other than a package, which is more likely to collide and has a relatively large influence at the time of collision, safety can be ensured by restricting landing and takeoff. It is thus possible to achieve both of improvement in safety and improvement in flexibility more effectively.

Further, through detection of objects in and near the port P for allowing the unmanned aerial vehicle 20 to land and take off, it is possible to control landing and takeoff in consideration of not only an object in the port P but also an object near the port P.

Further, through control of landing and takeoff of the unmanned aerial vehicle 20 based on the position of an object in or near the port P, for example, when a package is in the port P, landing can be restricted to place a priority on safety. Meanwhile, when a package is near the port P, landing can be prevented from being restricted to place a priority on flexibility. It is thus possible to achieve both of improvement in safety and improvement in flexibility more effectively.

Further, through setting of the restriction target type that depends on the position of an object in or near the port P, it is also possible to handle a situation in which the type of an object to be paid attention to differs depending on the position. It is thus possible to achieve both of improvement in safety and improvement in flexibility more effectively.

Further, through restriction of landing and takeoff of the unmanned aerial vehicle 20 based on whether the position of the object is in the port P or near the port P, for example, when a package is in the port P, landing can be restricted to place a priority on safety. Meanwhile, when a package is near the port P, landing can be prevented from being restricted to place a priority on flexibility. It is thus possible to achieve both of improvement in safety and improvement in flexibility more effectively.

Further, through setting of the restriction target type that depends on the flight mode, for example, it is also possible to handle a situation in which the type of an object to be paid attention to differs depending on the flight mode. It is thus possible to achieve both of improvement in safety and improvement in flexibility more effectively.

Further, through setting of the restriction target type depending on whether the unmanned aerial vehicle 20 is to land or take off, for example, it is also possible to handle a situation in which the type of an object to be paid attention to differs between landing and takeoff. It is thus possible to achieve both of improvement in safety and improvement in flexibility more effectively.

Further, when the unmanned aerial vehicle 20 takes off, identification of a package does not influence takeoff, and thus a priority is placed on flexibility without restricting takeoff. Meanwhile, when the unmanned aerial vehicle 20 lands, identification of a package influences landing, and thus a priority is placed on safety to restrict landing. It is thus possible to achieve both of improvement in safety and improvement in flexibility more effectively.

2. Second Embodiment

Next, a description is given of an unmanned aerial vehicle control system 1 according to another embodiment of the present invention (hereinafter referred to as "second embodiment"). As described in the first embodiment, when the unmanned aerial vehicle 20 lands, and there is a package in the port P or there is a user in or near the port P, landing of the unmanned aerial vehicle 20 may be affected. Thus, in the second embodiment, in order to allow the unmanned aerial vehicle 20 to prepare for smooth landing, in this embodiment, the unmanned aerial vehicle 20 transmits a predetermined message to the user when the unmanned aerial vehicle 20 is about to arrive.

Figure 13:
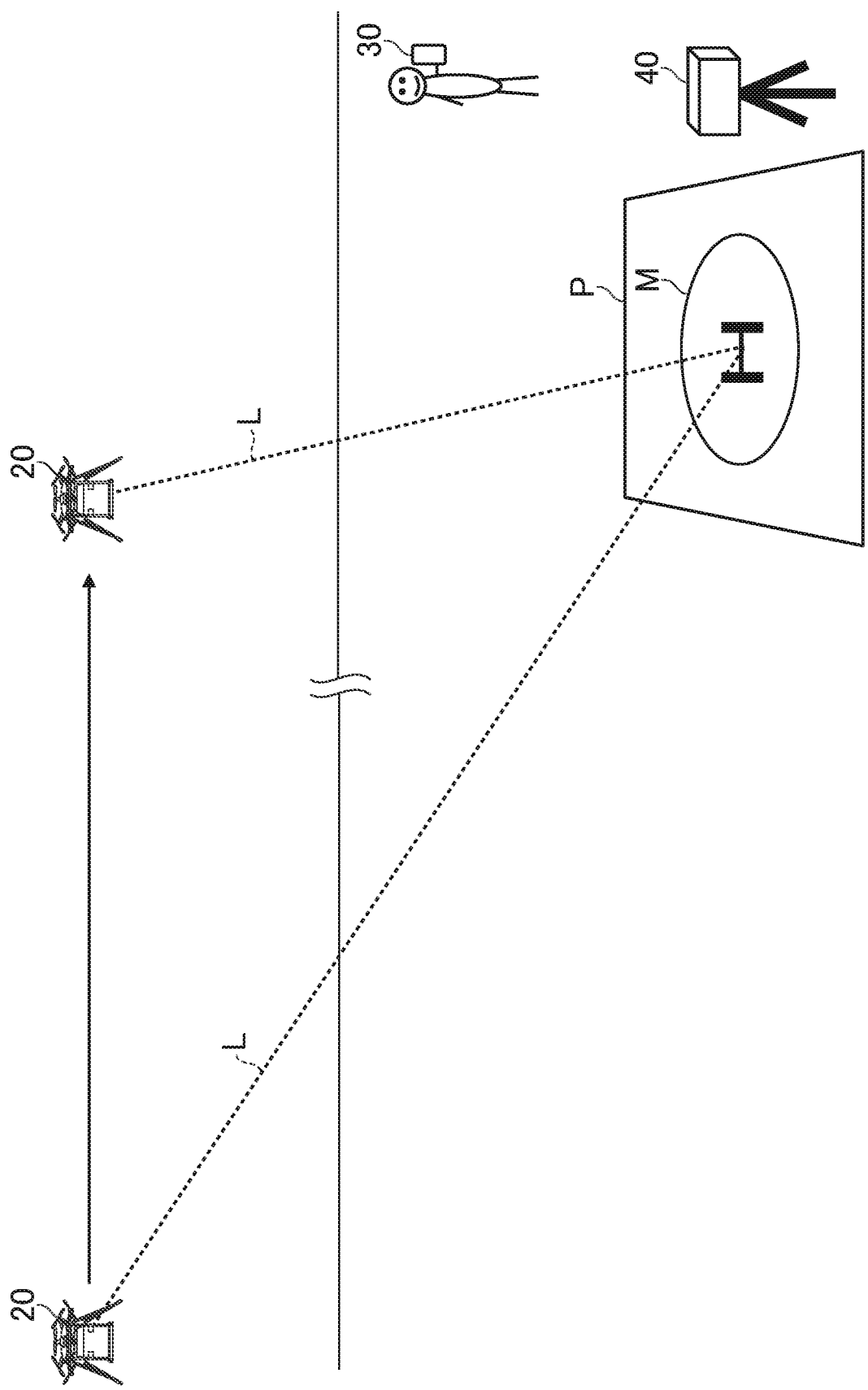
FIG. 13 is a diagram for illustrating a situation in which the unmanned aerial vehicle moves toward a port.

FIG. 13 is a diagram for illustrating a situation in which the unmanned aerial vehicle 20 moves toward the port P. As illustrated in FIG. 13, when the unmanned aerial vehicle 20 flies toward the port P and a distance L between the unmanned aerial vehicle 20 and the port P has become smaller than a first threshold value (e.g., 100 meters), the server 10 transmits a predetermined message to the user terminal 30. In FIG. 13, a straight-line distance L between the unmanned aerial vehicle 20 and the port P is set, but a distance in a horizontal direction may be used without considering a difference in altitude.

Figure 14:
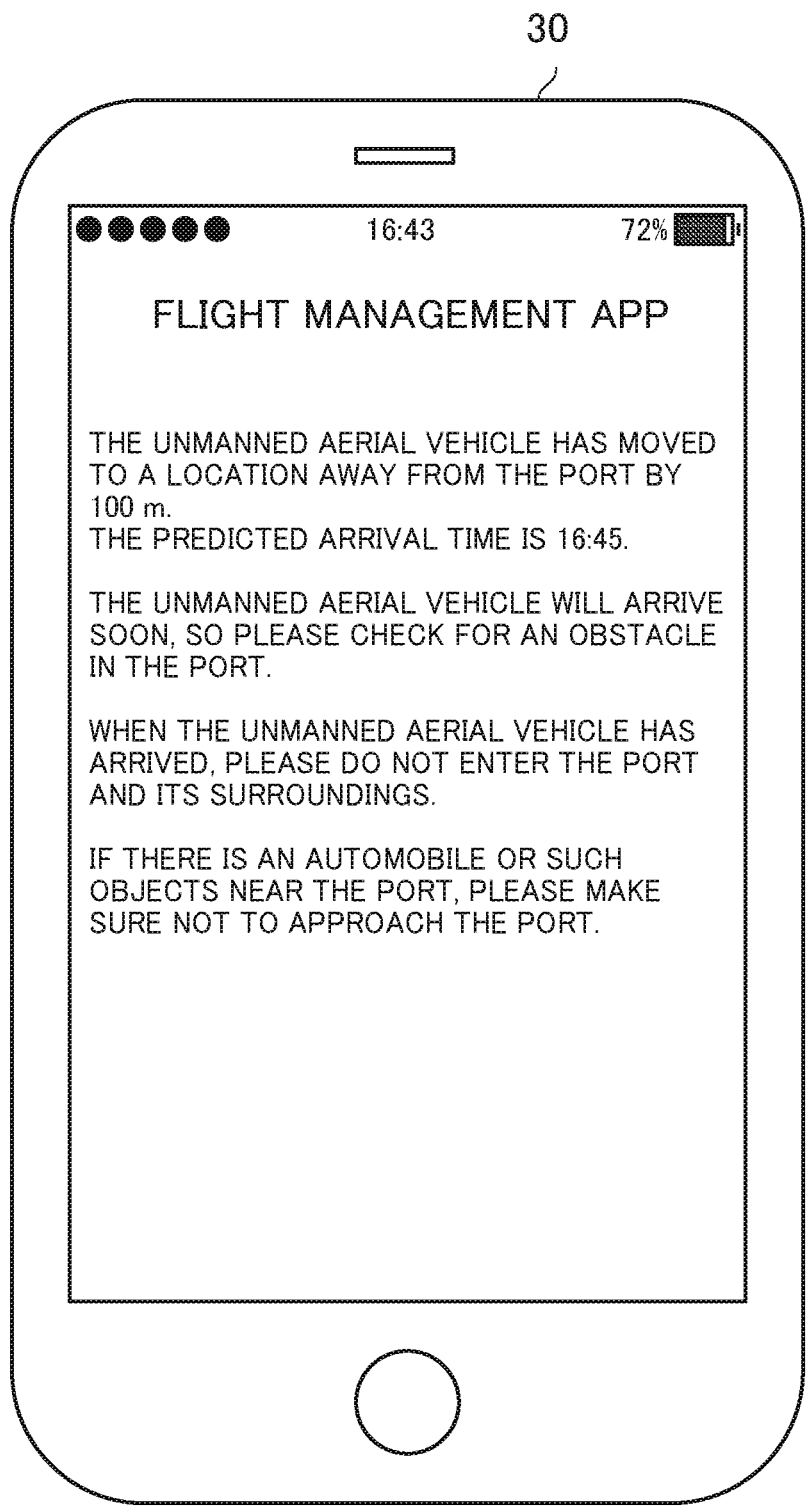
FIG. 14 is a diagram for illustrating an example of a message transmitted to a user terminal.

FIG. 14 is a diagram for illustrating an example of a message transmitted to the user terminal 30. Now, a description is given of a case in which the message is displayed on the flight management app of the user terminal 30. However, for example, any medium such as an e-mail, an SNS, a message application, or a push notification may be used for display.

As illustrated in FIG. 14, a message to the effect that the unmanned aerial vehicle 20 is about to arrive is displayed on the flight management app. Details of the message are not limited to the example of FIG. 14. For example, before the unmanned aerial vehicle 20 arrives at the air above the port P, the restrictor 104 may determine in advance whether to permit landing, and a result of the determination by the restrictor 104 may be displayed as a message.

After that, when the distance L between the unmanned aerial vehicle 20 and the port P has become smaller than a second threshold value (e.g., 10 meters), which is smaller than the first threshold value, the server 10 notifies the unmanned aerial vehicle 20 of an instruction to change the mode to the landing mode. When the unmanned aerial vehicle 20 has received the instruction, the unmanned aerial vehicle 20 changes from the autonomous flight mode to the landing mode. The operation after the mode is changed to the landing mode is as described in the first embodiment.

In FIG. 13 and FIG. 14, a description has been given of the processing at the time of takeoff. However, at the time of takeoff, irrespective of the distance between the unmanned aerial vehicle 20 and the port P, the server 10 may notify each of the unmanned aerial vehicle 20 and the user terminal 30 of information notifying of whether to permit takeoff, and a control signal to the effect that takeoff is to be performed may be transmitted when takeoff is permitted.

[2-1. Functions to be Implemented in Second Embodiment]

Figure 15:
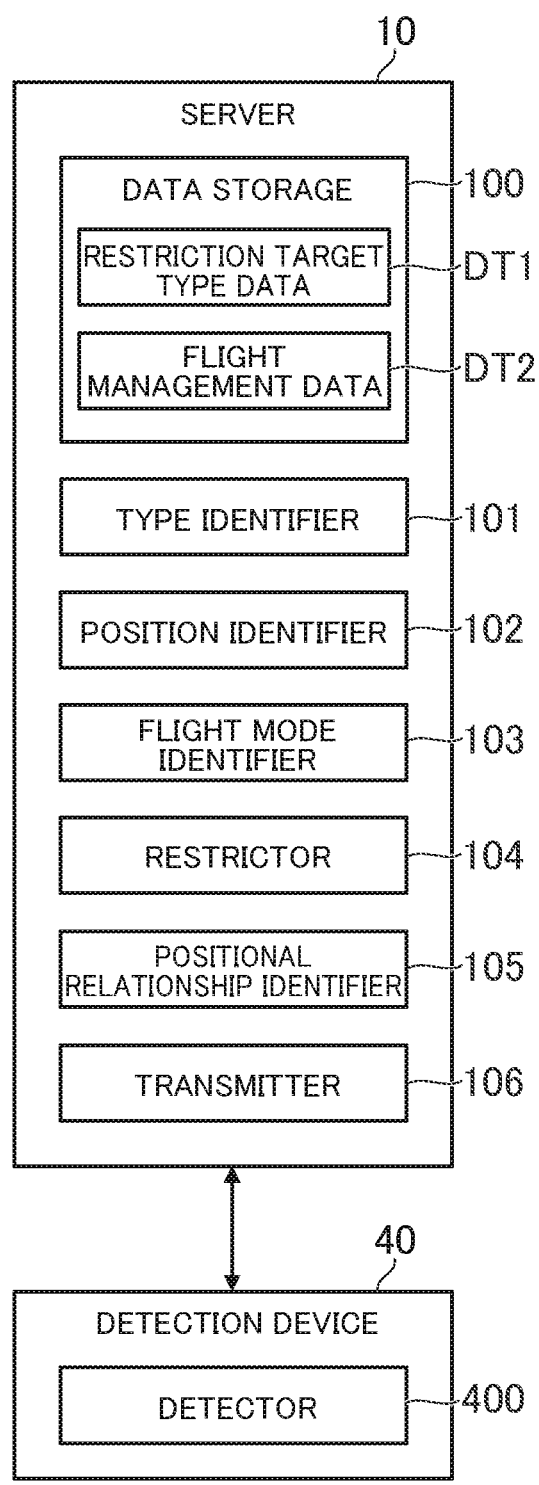
FIG. 15 is a functional block diagram of a second embodiment of the present invention.

FIG. 15 is a functional block diagram of the second embodiment. As illustrated in FIG. 15, in the second embodiment, a positional relationship identifier 105 and a transmitter 106 are implemented in addition to the functions described in the first embodiment. In this embodiment, a description is given of a case in which those functions are implemented in the server 10.

[Positional Relationship Identifier]

The positional relationship identifier 105 is mainly implemented by the controller 11. The positional relationship identifier 105 is configured to identify a positional relationship between the unmanned aerial vehicle 20 during flight and the port P. The position of the unmanned aerial vehicle 20 is indicated in positional information of the flight management data DT2, and the position of the port P is indicated in the destination location of the flight management data DT2. Thus, the positional relationship identifier 105 identifies the positional relationship based on the flight management data DT2.

The "positional relationship" is a position of the unmanned aerial vehicle 20 relative to the port P. For example, the positional relationship may be a distance between the unmanned aerial vehicle 20 and the port P, an angle (angle formed by the ground and a straight line connecting between the unmanned aerial vehicle 20 and the port P) of the unmanned aerial vehicle 20 with respect to the port P, or both of the distance and the angle. In this embodiment, the positional relationship identifier 105 identifies a distance between the unmanned aerial vehicle 20 during flight and the location as the positional relationship. The positional relationship identifier 105 calculates a distance between the position indicated by the positional information on the unmanned aerial vehicle 20 and the position of the port P. As described above, the distance may be a distance in a three-dimensional space, or may be a distance on a horizontal plane.

[Transmitter]

The transmitter 106 is mainly implemented by the controller 11. The transmitter 106 transmits information that depends on the positional relationship to a transmission destination that depends on the positional relationship identified by the positional relationship identifier 105. It is assumed that a relationship among the positional relationship, the transmission destination, and the type of information is stored in the data storage 100 in advance. The transmitter 106 transmits, based on the relationship, information on the type associated with a positional relationship identified by the positional relationship identifier 105, to a transmission destination associated with the positional relationship.

In this embodiment, the distance is acquired as the positional relationship, and thus the transmitter 106 transmits information that depends on the distance identified by the positional relationship identifier 105 to a transmission destination that depends on the distance. In this embodiment, the relationship among the distance, the transmission destination, and the type of information is stored in the data storage 100 in advance, and the transmitter 106 transmits, based on the relationship, information on the type associated with a distance identified by the positional relationship identifier 105, to a transmission destination associated with the distance.

For example, when the distance between the unmanned aerial vehicle 20 and the port P has become smaller than the first threshold value, the transmitter 106 transmits first information to a first transmission destination, and when the distance between the unmanned aerial vehicle 20 and the port P has become smaller than a second threshold value, which is smaller than the first threshold value, the transmitter 106 transmits second information to a second transmission destination. The first threshold value and the second threshold value are stored in the data storage 100 in advance, and an administrator, for example, can change the first threshold value and the second threshold value.

The first threshold value and the second threshold value may be set for any purpose, and for example, the first threshold value is a threshold value indicating a timing to notify the user of the fact that the unmanned aerial vehicle 20 is approaching the user. The second threshold value is a threshold value indicating a timing to execute processing of restricting landing of the unmanned aerial vehicle 20. For example, the first threshold value is a distance of from about several tens of meters to several kilometers, and the second threshold value is a distance of from about several meters to several tens of meters. A difference between the first threshold value and the second threshold value is only required to be a distance enabling the user to secure a sufficient length of time (e.g., about 1 minute to about 10 minutes) for checking, for example, a message.

For example, when the distance between the unmanned aerial vehicle 20 and the port P has become smaller than the first threshold value, the transmitter 106 transmits a predetermined message to the user terminal. Data indicating details of the message is stored in the data storage 100 in advance, and the transmitter 106 generates and transmits the message based on the data. As described above, the message may have any content. For example, the message indicates that the unmanned aerial vehicle 20 is about to arrive.

Further, for example, when the distance between the unmanned aerial vehicle 20 and the port P has become smaller than the second threshold value, the transmitter 106 transmits a control signal that is based on the restrictor 104 to the unmanned aerial vehicle 20. The control signal that is based on the restrictor 104 is a signal indicating that landing is not permitted, or a signal indicating that landing is permitted. For example, when landing is not permitted by the restrictor 104, the transmitter 106 transmits a signal indicating that landing is not permitted, or a signal indicating that the unmanned aerial vehicle 20 is to hover at the current location. Further, for example, when landing is permitted by the restrictor 104, the transmitter 106 transmits a signal indicating that landing is permitted. In a case where the mode is to transition to the landing mode for the first time after landing is permitted, when landing is permitted by the restrictor 104, the transmitter 106 transmits an instruction to transition to the landing mode.

When the distance between the unmanned aerial vehicle 20 and the port P has become smaller than the first threshold value, the transmitter 106 may transmit information to an apparatus other than the user terminal 30. For example, the transmitter 106 may transmit a deceleration instruction to the unmanned aerial vehicle 20, or may transmit an activation instruction to the detection device 40. Similarly, when the distance between the unmanned aerial vehicle 20 and the port P has become smaller than the second threshold value, the transmitter 106 may transmit information to an apparatus other than the unmanned aerial vehicle 20. For example, the transmitter 106 may transmit a predetermined message to the user terminal 30, or transmit an activation instruction to the detection device 40. In other cases, for example, when the distance between the unmanned aerial vehicle 20 and the port P has become smaller than the first threshold value or the second threshold value, the transmitter 106 may transmit a message to a terminal arranged in the port P, or transmit an instruction to turn on a light arranged near the port P.

Further, a description has been given of a case in which the first threshold value and the second threshold value are set as the threshold value for the distance between the unmanned aerial vehicle 20 and the port P. However, three or more threshold values may be set, or only one threshold value may be set. For example, when the distance is equal to or larger than the threshold value, the transmitter 106 may not particularly transmit information to the user terminal 30, and when the distance has become smaller than the threshold value, the transmitter 106 may transmit information, for example, a message, to the user terminal 30.

Further, for example, the transmission destination to which the transmitter 106 transmits information may be any one of the unmanned aerial vehicle 20, the user terminal 30, and the detection device 40, or may be another computer, for example, a terminal arranged in the port P. Further, for example, the transmitter 106 may transmit any information described above, and in addition, the transmitter 106 may transmit, for example, an instruction for requesting a remaining battery life of the unmanned aerial vehicle 20, a request to the effect that the user terminal 30 is to activate a videophone function, or a request for changing a detection condition of the detection device 40.

[2-2. Processing to be Executed in Second Embodiment]

Figure 16:
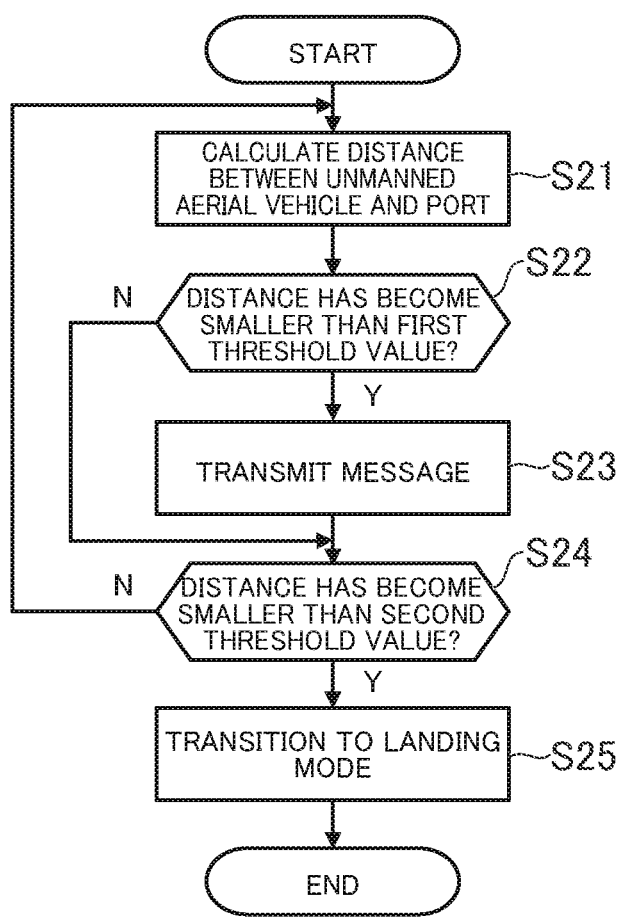
FIG. 16 is a diagram for illustrating processing to be executed in the second embodiment.

FIG. 16 is a diagram for illustrating processing to be executed in the second embodiment. The processing described below is executed by the controller 11 operating in accordance with a program stored in the storage 12. The processing described below is an example of processing of the functional blocks illustrated in FIG. 16.

As illustrated in FIG. 16, the controller 11 calculates a distance between the unmanned aerial vehicle 20 and the port P based on the flight management data DT2 (Step S21). In Step S21, the controller 11 calculates a distance between a position indicated by the positional information on the unmanned aerial vehicle 20 and the destination location, which are stored in the flight management data DT2.

The controller 11 determines whether the distance calculated in Step S21 is smaller than the first threshold value (Step S22). It is assumed that the first threshold value is stored in the storage 12 in advance. When it is determined that the distance is smaller than the first threshold value (Step S22: Y), the controller 11 transmits a message to the user terminal 30 (Step S23). It is assumed that the message is stored in the storage 12 in advance.

The controller 11 determines whether the distance calculated in Step S21 is smaller than the second threshold value (Step S24). It is assumed that the second threshold value is stored in the storage 12 in advance. When it is determined that the distance is smaller than the second threshold value (Step S24: Y), the controller 11 transmits, to the unmanned aerial vehicle 20, a notification to the effect that the mode transitions to the landing mode (Step S25), and this processing is finished. After that, the processing of FIG. 11 described in the first embodiment is executed.

According to the unmanned aerial vehicle control system 1 of the second embodiment, information that depends on the positional relationship between the unmanned aerial vehicle 20 and the port P is transmitted to the transmission destination that depends on the positional relationship. As a result, for example, the server 10 can transmit a flight situation of the unmanned aerial vehicle 20 to the user terminal 30 when a predetermined positional relationship between the unmanned aerial vehicle 20 and the port P is satisfied, and the server 10 can transmit a predetermined signal to the unmanned aerial vehicle 20 when another positional relationship is satisfied. Therefore, it is possible to improve convenience at a time of flying the unmanned aerial vehicle 20.

Further, through acquisition of the distance between the unmanned aerial vehicle 20 and the port P as the positional relationship and through transmission of information that depends on the positional relationship to the transmission destination that depends on the distance, for example, the server 10 can transmit the flight situation of the unmanned aerial vehicle 20 to the user terminal 30 when the distance between the unmanned aerial vehicle 20 and the port P has become smaller than a predetermined distance, and the server 10 can transmit a predetermined signal to the unmanned aerial vehicle 20 when the unmanned aerial vehicle 20 becomes further closer to the port P. Therefore, it is possible to improve convenience at a time of flying the unmanned aerial vehicle 20.

Further, the first information is transmitted to the first transmission destination when the distance between the unmanned aerial vehicle 20 and the port P has become smaller than the first threshold value, and the second information is transmitted to the second transmission destination when the distance has become smaller than the second threshold value, to thereby be able to improve convenience at a time of flying the unmanned aerial vehicle 20.

Further, a predetermined message is transmitted to the user terminal 30 when the distance between the unmanned aerial vehicle 20 and the port P has become smaller than the first threshold value, and a control signal indicating permission of landing and takeoff is transmitted to the unmanned aerial vehicle 20 when the distance has become smaller than the second threshold value, to thereby be able to improve convenience at a time of flying the unmanned aerial vehicle 20.

3. Modification Example

One embodiment of the present invention is not limited to the embodiments described above. The one embodiment of the present invention can be modified appropriately without departing from the gist of the one embodiment of the present invention.

For example, in the second embodiment, landing and takeoff may not be restricted as in the first embodiment. In this case, for example, when the distance between the unmanned aerial vehicle 20 and the port P has become smaller than the first threshold value, the server 10 may transmit a predetermined message to the user terminal 30. Then, when the distance has become smaller than the second threshold value, the server 10 may instruct the unmanned aerial vehicle 20 to transition to the landing mode without particular restriction by the restrictor 104. Also in this way, the user can receive a message in advance to be given time to remove a package on the port P and time to give a notification to the surroundings. Therefore, safety can be improved, and landing of the unmanned aerial vehicle 20 is not restricted, and thus it is also possible to improve flexibility.

Further, for example, in the second embodiment, a description has been given of a case in which information that depends on the positional relationship between the unmanned aerial vehicle 20 and the port P is transmitted to the transmission destination that depends on the positional relationship. However, information that depends on the flight mode of the unmanned aerial vehicle 20 may be transmitted to the transmission destination that depends on the flight mode. In this case, it is assumed that the transmission destination and the type of information to be transmitted are associated with each other in the data storage 100 for each flight mode. The server 10 identifies the flight mode of the unmanned aerial vehicle 20 based on the flight management data DT2, and transmits information on the type associated with the identified flight mode to the transmission destination associated with the flight mode. For example, the server 10 may set the transmission destination and type of information to be different between the landing mode and the takeoff mode.

Further, for example, the unmanned aerial vehicle 20 may not particularly carry a package. The unmanned aerial vehicle 20 may fly for various kinds of purposes, and may fly for purposes other than carrying a package, such as photography, detection of weather information, security, or spray of agricultural chemicals.

Further, for example, the unmanned aerial vehicle control system 1 may include another computer (e.g., server computer or personal computer), and the computer may execute flight control of each unmanned aerial vehicle 10. For example, the data storage 100 may be implemented by a database server included in the unmanned aerial vehicle control system 1, or may be implemented by a database server outside the unmanned aerial vehicle control system 1.

Further, for example, each function described above may be implemented by any computer included in the unmanned aerial vehicle control system 1, and a plurality of computers such as the server 10, the unmanned aerial vehicle 20, and the user terminal 30 may implement each function in a distributed manner.

The invention claimed is:

1. An unmanned aerial vehicle control system, comprising at least one processor configured to:
    detect an object existing at a location at which at least one of landing or takeoff of an unmanned aerial vehicle is to be performed;
    identify a type of the object based on a result of detection;
    restrict at least one of landing or takeoff of the unmanned aerial vehicle based on the identified type;
    identify a positional relationship between the unmanned aerial vehicle during flight and the location;
    transmit information that depends on the identified positional relationship to a transmission destination that depends on the positional relationship;

identify, as the positional relationship, a distance between the unmanned aerial vehicle during flight and the location, transmit information that depends on the identified distance to a transmission destination that depends on the distance;

transmit first information to a first transmission destination when the distance has become smaller than a first threshold value; and transmit second information to a second transmission destination when the distance has become smaller than a second threshold value, which is smaller than the first threshold value.

2. The unmanned aerial vehicle control system according to claim 1, wherein the at least one processor is configured to identify, as the type, whether the object is still, or whether the object is moving or is movable, and wherein the at least one processor is configured to restrict at least one of landing or takeoff of the unmanned aerial vehicle based on whether the object is still or whether the object is moving or is movable.

3. The unmanned aerial vehicle control system according to claim 1, wherein the unmanned aerial vehicle is capable of carrying a package, wherein the at least one processor is configured to identify, as the type, whether the object is a package or whether the object is something other than a package, and wherein the at least one processor is configured to restrict at least one of landing or takeoff of the unmanned aerial vehicle based on whether the object is a package or whether the object is something other than a package.

4. The unmanned aerial vehicle control system according to claim 1, wherein an area for enabling the unmanned aerial vehicle to perform at least one of landing or takeoff is determined in advance as the location, and wherein the at least one processor is configured to detect at least one of an object existing in the area or an object existing near the area.

5. The unmanned aerial vehicle control system according to claim 1, wherein the at least one processor is configured to identify a position of the object, and wherein the at least one processor is configured to restrict at least one of landing or takeoff of the unmanned aerial vehicle based further on the identified position.

6. The unmanned aerial vehicle control system according to claim 5, wherein the at least one processor is configured to restrict at least one of landing or takeoff of the unmanned aerial vehicle when the identified type is a predetermined restriction target type, and wherein the predetermined restriction target type is set in accordance with the identified position.

7. The unmanned aerial vehicle control system according to claim 5, wherein an area for enabling the unmanned aerial vehicle to perform at least one of landing or takeoff is determined in advance as the location, wherein the at least one processor is configured to identify whether the position is in the area or near the area, and wherein the at least one processor is configured to restrict at least one of landing or takeoff of the unmanned aerial vehicle based on whether the object is in the area or near the area.

8. The unmanned aerial vehicle control system according to claim 1, wherein the at least one processor is configured to restrict at least one of landing or takeoff of the unmanned aerial vehicle when the identified type is a predetermined restriction target type, wherein the unmanned aerial vehicle is configured to fly based on any one of a plurality of flight modes, wherein the at least one processor is configured to identify a flight mode of the unmanned aerial vehicle, and wherein the predetermined restriction target type is set in accordance with the flight mode.

9. The unmanned aerial vehicle control system according to claim 1, wherein the at least one processor is configured to restrict at least one of landing or takeoff of the unmanned aerial vehicle when the identified type is a predetermined restriction target type, and wherein the predetermined restriction target type is set depending on whether the unmanned aerial vehicle is to perform landing or takeoff.

10. The unmanned aerial vehicle control system according to claim 9, wherein the unmanned aerial vehicle is capable of carrying a package, wherein the predetermined restriction target type is a package, wherein the at least one processor is configured to avoid restricting takeoff of the unmanned aerial vehicle when the unmanned aerial vehicle is to take off and a package has been identified, and wherein the at least one processor is configured to restrict landing of the unmanned aerial vehicle when the unmanned aerial vehicle is to land and a package has been identified.

11. The unmanned aerial vehicle control system according to claim 1, wherein the at least one processor is configured to:

transmit a predetermined message to a user terminal when the distance has become smaller than the first threshold value; and transmit a control signal that is based on the restriction to the unmanned aerial vehicle when the distance has become smaller than the second threshold value.

12. An unmanned aerial vehicle control method, comprising:

detecting an object existing at a location at which at least one of landing or takeoff of an unmanned aerial vehicle is to be performed;

identifying a type of the object based on a result of detection performed in the detection step;

restricting at least one of landing or takeoff of the unmanned aerial vehicle based on the identified type;

identifying a positional relationship between the unmanned aerial vehicle during flight and the location;

transmitting information that depends on the identified positional relationship to a transmission destination that depends on the positional relationship;

identifying, as the positional relationship, a distance between the unmanned aerial vehicle during flight and the location, transmitting information that depends on the identified distance to a transmission destination that depends on the distance;

transmitting first information to a first transmission destination when the distance has become smaller than a first threshold value; and transmitting second information to a second transmission destination when the distance has become smaller than a second threshold value, which is smaller than the first threshold value.

13. A non-transitory computer-readable information storage medium for storing a program for causing a computer to:

identify, based on a result of detection for an object existing at a location at which at least one of landing or takeoff of an unmanned aerial vehicle is to be performed, a type of the object;

restrict at least one of landing or takeoff of the unmanned aerial vehicle based on the identified type;

identify a positional relationship between the unmanned aerial vehicle during flight and the location;

transmit information that depends on the identified positional relationship to a transmission destination that depends on the positional relationship;

identify, as the positional relationship, a distance between the unmanned aerial vehicle during flight and the location, transmit information that depends on the identified distance to a transmission destination that depends on the distance;

transmit first information to a first transmission destination when the distance has become smaller than a first threshold value; and transmit second information to a second transmission destination when the distance has become smaller than a second threshold value, which is smaller than the first threshold value.

* * * * *